United States Patent
Setomoto et al.

(10) Patent No.: US 9,591,730 B2
(45) Date of Patent: Mar. 7, 2017

(54) LIGHTING APPARATUS AND LIGHTING SYSTEM WITH A CONTROLLER FOR CALCULATING STANDBY TIME

(71) Applicant: Panasonic Intellectual Property Management Co., Ltd., Osaka (JP)

(72) Inventors: Tatsumi Setomoto, Osaka (JP); Tamotsu Ando, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/822,934

(22) Filed: Aug. 11, 2015

(65) Prior Publication Data

US 2016/0073483 A1 Mar. 10, 2016

(30) Foreign Application Priority Data

Sep. 8, 2014 (JP) .................................. 2014-182562

(51) Int. Cl.
 *H05B 37/02* (2006.01)
 *H04B 10/116* (2013.01)

(52) U.S. Cl.
 CPC ....... *H05B 37/0272* (2013.01); *H04B 10/116* (2013.01); *H05B 37/0281* (2013.01)

(58) Field of Classification Search
 CPC ............ H05B 37/0272; H05B 37/0281; H04B 10/116
 See application file for complete search history.

(56) References Cited

U.S. PATENT DOCUMENTS

| 6,331,756 B1 * | 12/2001 | Belliveau ............. | H05B 37/029 315/316 |
| 8,981,671 B2 | 3/2015 | Karasawa et al. | |
| 2009/0009103 A1 * | 1/2009 | McKechnie ............. | G09F 9/33 315/291 |

(Continued)

FOREIGN PATENT DOCUMENTS

| JP | 08-098264 A | 4/1996 |
| JP | 2000-067351 A | 3/2000 |

(Continued)

*Primary Examiner* — Tung X Le
*Assistant Examiner* — Raymond R Chai
(74) *Attorney, Agent, or Firm* — Renner, Otto, Boisselle & Sklar, LLP

(57) ABSTRACT

A lighting apparatus which is one of a plurality of lighting apparatuses each capable of performing wireless communication with a control device. The lighting apparatus includes: a light emitting unit; a controller which controls turn-on of the light emitting unit; and a communication unit configured to perform wireless communication with the control device to obtain correction time from the control device, the correction time being based on communication delay between the control device and each lighting apparatus. The communication unit further obtains a turn-on instruction for turning on the light emitting unit from the control device, and transmits a response to the turn-on instruction to the control device upon obtainment of the turn-on instruction. The controller turns on the light emitting unit after passage of a time period from when the response is transmitted to the device, the time period being calculated by subtracting communication latency from the correction time.

21 Claims, 33 Drawing Sheets

(56) References Cited

U.S. PATENT DOCUMENTS

2012/0268034 A1 10/2012 Karasawa et al.
2013/0173742 A1* 7/2013 Thomas .............. H04L 65/4076
                                                                        709/217

FOREIGN PATENT DOCUMENTS

| | | |
|---|---|---|
| JP | 2002-289372 A | 10/2002 |
| JP | 2003-016831 A | 1/2003 |
| JP | 2005-019000 A | 1/2005 |
| JP | 2005-051728 A | 2/2005 |
| JP | 2005-135644 A | 5/2005 |
| JP | 2005-157744 A | 6/2005 |
| JP | 2006-080007 A | 3/2006 |
| JP | 2006-140764 A | 6/2006 |
| JP | 2007-287679 A | 11/2007 |
| JP | 2008-035108 A | 2/2008 |
| JP | 2009-140644 A | 6/2009 |
| JP | 2009-261009 A | 11/2009 |
| JP | 2012-004062 A | 1/2012 |
| JP | 2012-169195 A | 9/2012 |
| JP | 2012-226993 A | 11/2012 |
| JP | 2013-048014 A | 3/2013 |
| JP | 2013-152934 A | 8/2013 |
| JP | 2013-246981 A | 12/2013 |
| JP | 2014-022112 A | 2/2014 |
| JP | 2014-072744 A | 4/2014 |

* cited by examiner

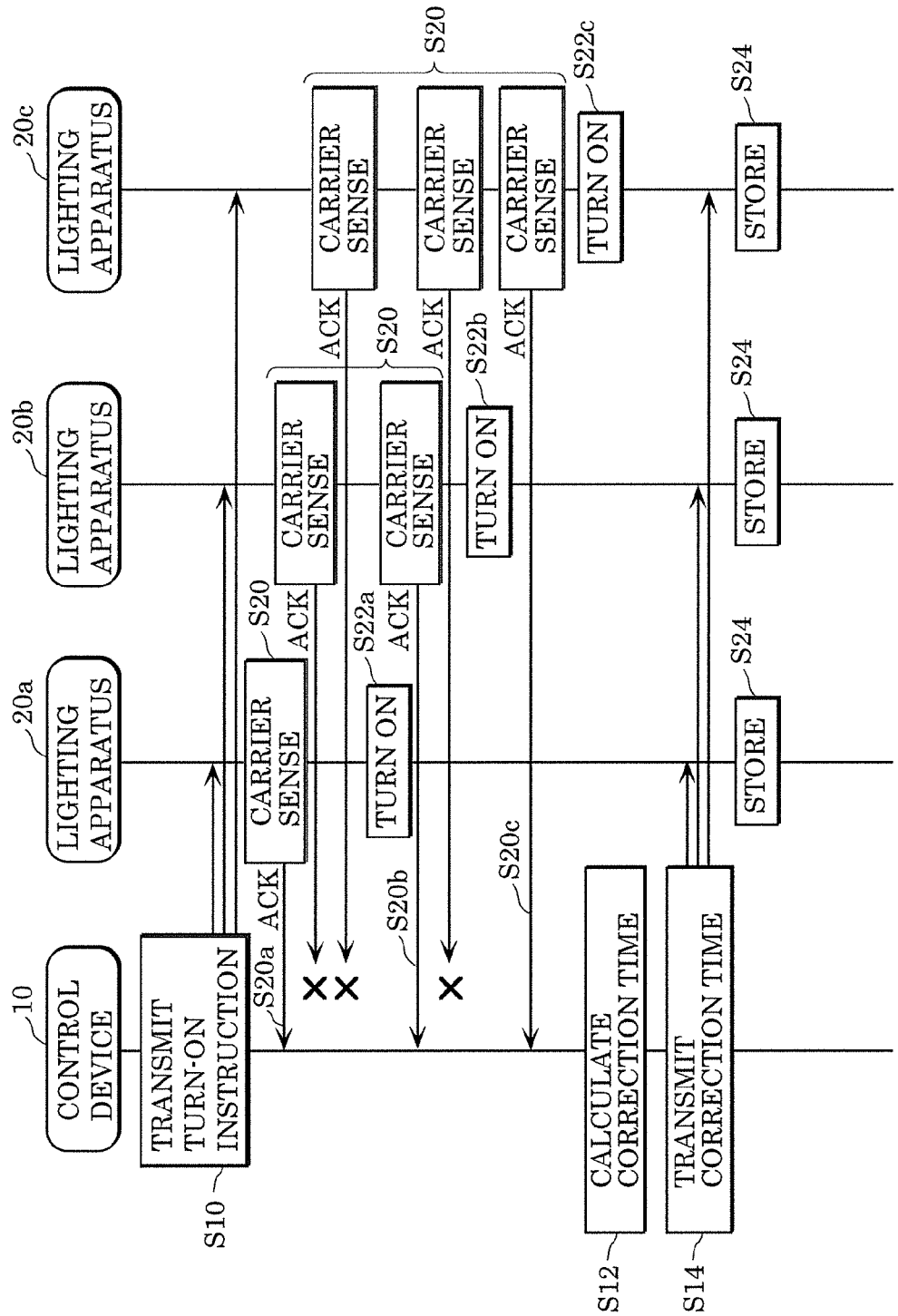

FIG. 24

| | ASSUMED CASES | VERIFY CONDITION |
|---|---|---|
| (a) | NO HEAT INSULATION ABOVE CEILING | 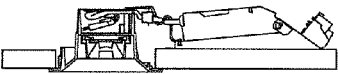 |
| (b) | WITH HEAT INSULATION ABOVE CEILING<br><br>MATERIAL: GLASS FIBER | HEAT INSULATING MAT 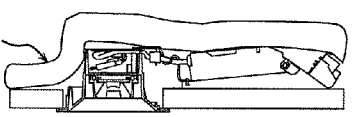 |
| (c) | WITH HEAT INSULATION ABOVE CEILING<br><br>MATERIAL : GLASS FIBER + ALUMINUM FOIL | WITH ALUMINUM FOIL 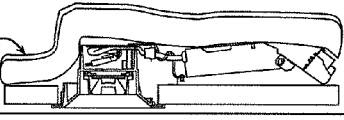 |
| (d) | WITH HEAT INSULATING MATERIAL REDUCED IN THICKNESS DUE TO AGING<br><br>MATERIAL: GLASS FIBER AND ALUMINUM FOIL | HEAT INSULATING MAT WITH ALUMINUM FOIL HAS BEAN COMPRESSED USING FUTON COMPRESSOR 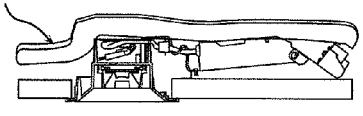 |
| (e) | EXISTENCE OF DECK PLATE | ALUMINUM PLATE 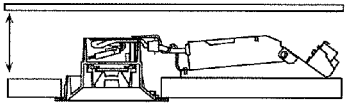 |
| (f) | EXISTENCE OF METAL BUILDING MATERIALS SUCH AS PIPE, WIRING, AND DUCT (WORST CASE) | ALUMINUM FOIL 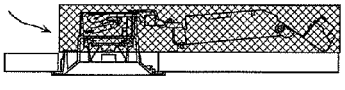 |

LIGHTING APPARATUS AND LIGHTING SYSTEM WITH A CONTROLLER FOR CALCULATING STANDBY TIME

CROSS REFERENCE TO RELATED APPLICATION

This application claims the benefit of priority of Japanese Patent Application Number 2014-182562, filed Sep. 8, 2014, the entire content of which is hereby incorporated by reference.

BACKGROUND OF THE INVENTION

1. Field of the Invention

The present disclosure relates to lighting apparatuses and lighting systems each capable of performing wireless communication.

2. Description of the Related Art

A conventional technique is available in which turn-on and turn-off of a plurality of lighting apparatuses are controlled by performing wireless communication with the lighting apparatuses. For example, Japanese Unexamined Patent Application Publication No. 2013-48014 discloses a technique of transmitting a turn-on instruction using multicast. This technique is intended to simultaneously turn on a plurality of lighting apparatuses.

SUMMARY OF THE INVENTION

However, consideration of communication delay has not been given to the lighting apparatuses according to the above conventional technique. In other words, even if a control device transmits a turn-on instruction using multicast, the lighting apparatuses cannot be simultaneously turned on due to communication delay between the control device and the lighting apparatuses.

An object of the present disclosure is to provide lighting apparatuses which can be simultaneously turned on and a lighting system which is capable of simultaneously turning on the lighting apparatuses.

In order to achieve the above object, the lighting apparatus according to one aspect of the present disclosure is a lighting apparatus which is one of a plurality of lighting apparatuses each capable of performing wireless communication with a device. The lighting apparatus includes: a light emitting unit; a controller which controls turn-on of the light emitting unit; and a communication unit which performs wireless communication with the device to obtain a correction time from the device, the correction time being based on communication delay between the device and each of the plurality of lighting apparatuses. The communication unit further obtains a turn-on instruction for turning on the light emitting unit from the device, and transmits a response to the turn-on instruction to the device upon obtainment of the turn-on instruction, and the controller turns on the light emitting unit after passage of a time period from when the response is transmitted to the device, the time period being calculated by subtracting a communication latency from the correction time.

According to the present disclosure, a plurality of lighting apparatuses can be simultaneously turned on.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 8 is a sequence diagram of calculation processing of correction time in the lighting system according to Embodiment 1 of the present disclosure;

FIG. 24 illustrates possible cases assumed in installation of the lighting apparatus according to Embodiment 4 of the present disclosure;

DETAILED DESCRIPTION OF THE PREFERRED EMBODIMENTS

Figure 1:
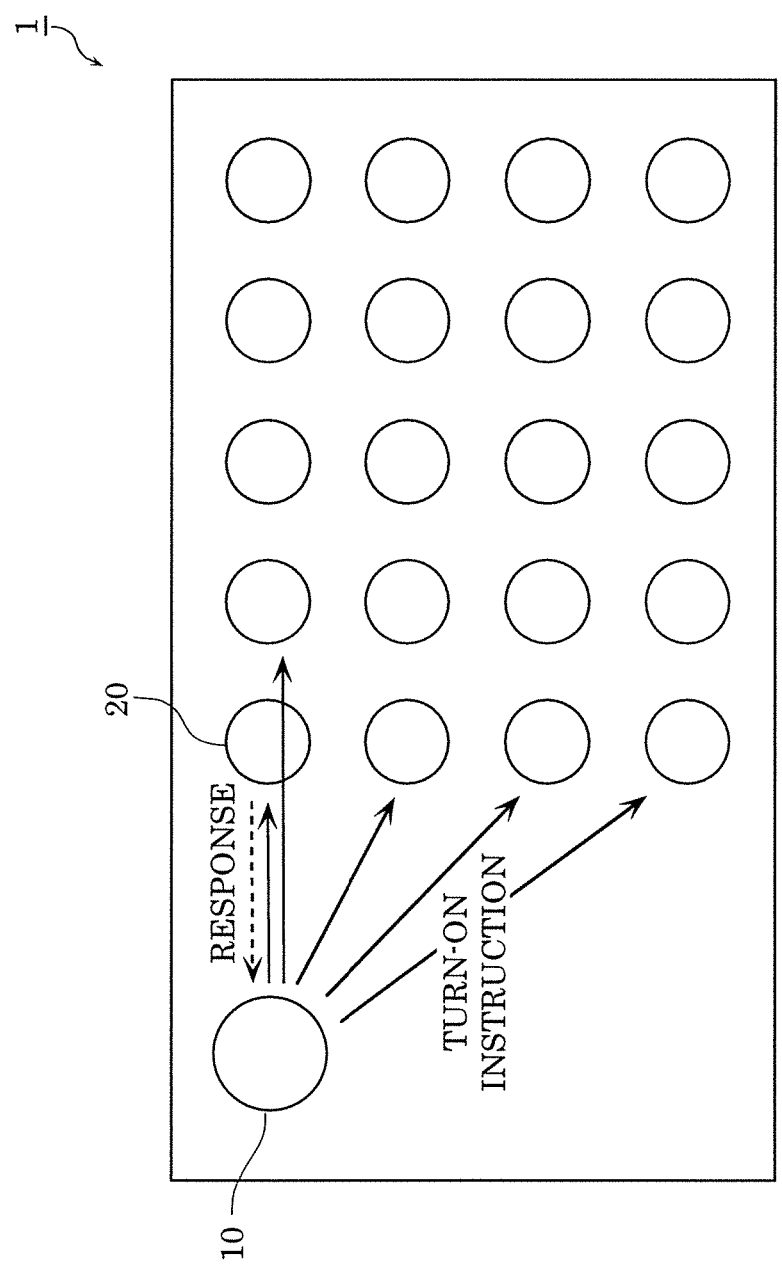
FIG. 1 schematically illustrates a layout of a plurality of lighting apparatuses in a lighting system according to Embodiment 1 of the present disclosure.

Hereinafter, a lighting apparatus and a lighting system according to embodiments of the present disclosure will be described with reference to the drawings. It should be noted that each of the following embodiments shows one specific preferred example. The numerical values, shapes, materials, structural elements, the arrangement and connection of the structural elements etc. shown in the following embodiments are mere examples, and therefore do not limit the present disclosure. As such, among the structural elements in the following embodiments, structural elements not recited in any one of the independent claims which indicate the broadest concepts of the present disclosure are described as arbitrary structural elements.

Note that the respective figures are schematic diagrams and are not necessarily precise illustrations. Additionally, similar structural elements share like reference numbers in the drawings.

Embodiment 1

Lighting System

First, a lighting system according to Embodiment 1 will be briefly described with reference to FIG. 1. FIG. 1 schematically illustrates a layout of a plurality of lighting apparatuses in lighting system 1 according to Embodiment 1.

As FIG. 1 illustrates, lighting system 1 includes control device 10 and a plurality of lighting apparatuses 20. Control device 10 performs wireless communication with lighting apparatuses 20 to control, for example, turn-on of lighting apparatuses 20.

Control device 10 is capable of performing wireless communication with lighting apparatuses 20. For example, control device 10 is a mobile information terminal such as a remote controller, a smart phone, and a personal digital assistance (PDA). Control device 10 may be one of lighting apparatuses 20.

Each of lighting apparatuses 20 is capable of performing wireless communication with control device 10, and is, for example, a base light, a ceiling light, a recessed light, and a spotlight. Each lighting apparatus 20 is, for example, located within a 30 m radius from control device 10.

In Embodiment 1, control device 10 and lighting apparatuses 20 are connected in a star topology. Control device 10 corresponds to a hub in the star topology. The network topology is not limited to the above example, but may be any other topology such as ring, mesh, tree, line, or fully connected topology.

Specifically, as illustrated by solid lines in FIG. 1, control device 10 transmits a turn-on instruction to lighting apparatuses 20 using multicast. Additionally, as illustrated by a dashed line in FIG. 1, control device 10 receives a response to the turn-on instruction from each of lighting apparatuses 20 using unicast.

[Functional Configuration of Lighting System]

Figure 2:
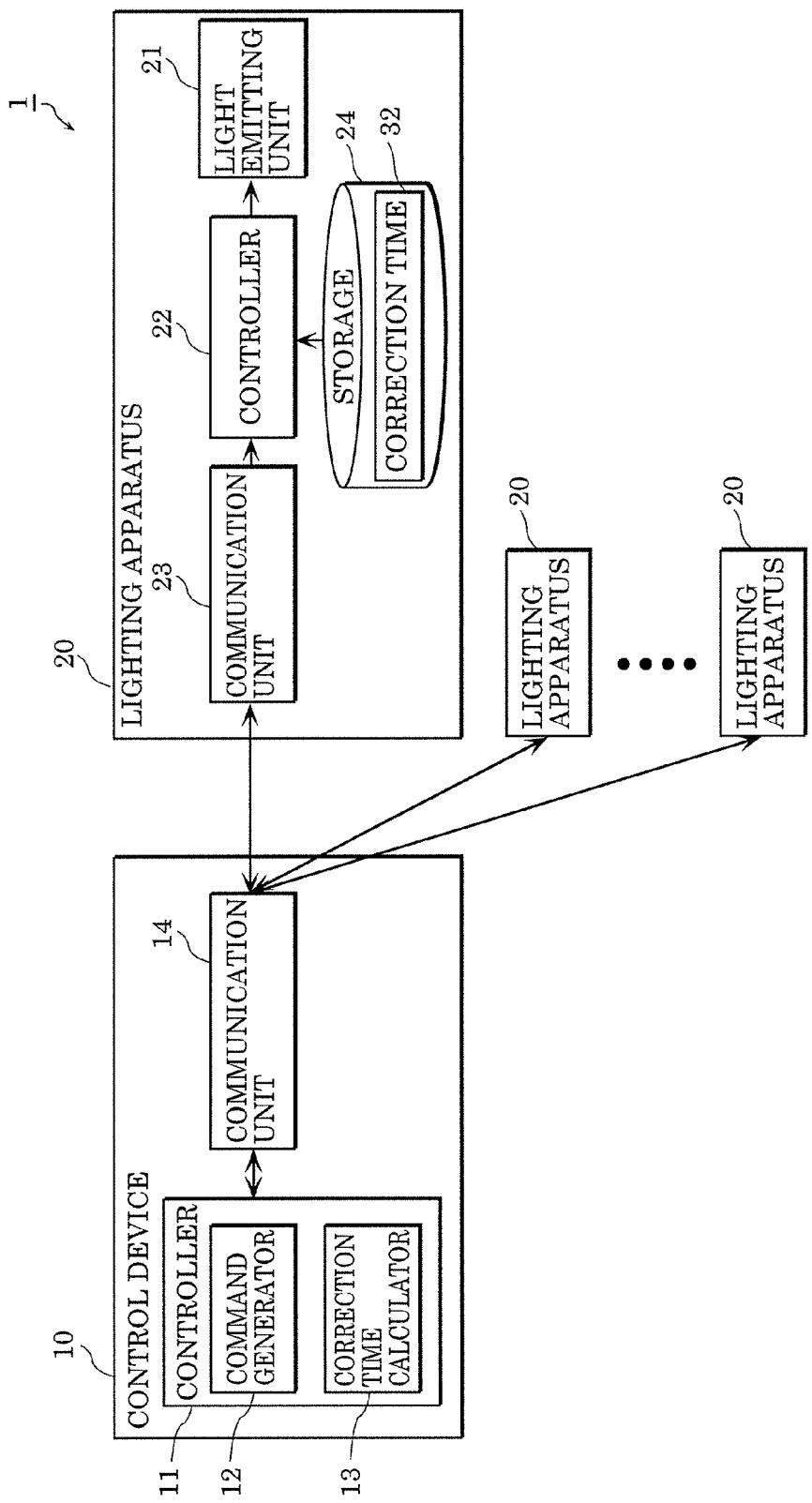
FIG. 2 is a block diagram of a functional configuration of the lighting system according to Embodiment 1 of the present disclosure.

Next, a functional configuration of lighting system 1 according to Embodiment 1 will be described with reference to FIG. 2. FIG. 2 is a block diagram illustrating a functional configuration of lighting system 1 according to Embodiment 1.

[Control Device]

First, a functional configuration of control device 10 will be described.

As FIG. 2 illustrates, control device 10 includes controller 11 and communication unit 14. Controller 11 is a processing unit which controls control device 10. Specifically, controller 11 includes command generator 12 and correction time calculator 13.

Controller 11 is formed of, for example, a non-volatile memory such as a read-only memory (ROM) which stores a program (such as an application program), a central processing unit (CPU) which executes the program, or a volatile memory such as a random access memory (RAM) serving as a temporary working area at the time of execution by the CPU. Controller 11 is, for example, a microcontroller.

Command generator 12 generates a turn-on instruction for simultaneously turning on lighting apparatuses 20. The turn-on instruction is, for example, a command for causing each lighting apparatus which has received the turn-on instruction to turn on its light emitting unit. In other words, the turn-on instruction is not required to include, for example, information for identifying the lighting apparatus to be turned on. Each of lighting apparatuses 20 turns on the light emitting unit included in lighting apparatus 20, upon receipt of the turn-on instruction.

Correction time calculator 13 calculates correction time based on communication delay between control device 10 and each of lighting apparatuses 20. The correction time is calculated based on the communication time between control device 10 and lighting apparatus 20 requiring a longest communication time among lighting apparatuses 20. A specific method of calculating the correction time will be described later. The calculated correction time is transmitted to lighting apparatuses 20 via communication unit 14.

Communication unit 14 is an example of a first communication unit which performs wireless communication with lighting apparatuses 20. For example, communication unit 14 is a wireless communication module which performs wireless communication using ZigBee (registered trademark) which is one of standards of wireless personal area network (WPAN). The communication method used by communication unit 14 is not limited to the above example. Communication unit 14 may perform communication using a wireless local area network (LAN) such as Bluetooth (registered trademark) or Wi-Fi (registered trademark). The frequency used in the wireless communication is, for example, a frequency ranging from 421 MHz to 2483.5 MHz, inclusive.

Specifically, communication unit 14 transmits the turn-on instruction generated by command generator 12 to lighting apparatuses 20. Here, communication unit 14 transmits the turn-on instruction to lighting apparatuses 20 using multicast. Communication unit 14 also transmits the correction time calculated by correction time calculator 13 to lighting apparatuses 20.

Communication unit 14 receives a response to the transmitted turn-on instruction from each of lighting apparatuses 20. Specifically, communication unit 14 receives an ACK response from each of lighting apparatuses 20 using unicast.

[Lighting Apparatus]

Next, a functional configuration of each lighting apparatus 20 will be described.

As FIG. 2 illustrates, lighting apparatus 20 includes light emitting unit 21, controller 22, communication unit 23, and storage 24.

Light emitting unit 21 is a light-emitting module which includes a light emitting element, and emits light of a predetermined color (wavelength) such as white. In Embodiment 1, light emitting unit 21 includes, for example, a housing such as a glass bulb, and a light emitting diode (LED) module disposed in the housing.

The LED module is specifically a chip on board (COB) light emitting module in which an LED chip is directly mounted on a board, but the LED module is not limited to the example. For example, the LED module may be a light emitting module which includes a so-called surface mount device (SMD) LED element as a light emitting element. The SMD LED element is specifically a packaged LED element in which an LED chip is mounted in a cavity of a resin molded container which is filled with a phosphor-containing resin. The light emitting element included in light emitting unit 21 may be, for example, a semiconductor light emitting element such as a semiconductor laser or any other solid light emitting element such as an organic electro luminescence (EL) or an inorganic EL element.

Controller 22 is formed of, for example, a non-volatile memory such as a ROM which stores a program (such as an application program), a CPU which executes the program, or a volatile memory such as a RAM serving as a temporary working area at the time of execution by the CPU. Controller 22 is, for example, a microcontroller.

Controller 22 controls turn-on of light emitting unit 21. Controller 22 may further control turn-off, dimming, and color adjustment of light emitting unit 21. Controller 22 turns on light emitting unit 21 after passage of a time period from when communication unit 23 transmits a response. The time period is calculated by subtracting communication latency from the correction time. Details of the turn-on control by controller 22 will be described later.

Communication unit 23 is an example of a second communication unit which performs wireless communication with control device 10. For example, communication unit 23 is a wireless communication module which performs wireless communication using ZigBee (registered trademark) which is one of standards of WPAN. The communication method used by communication unit 23 is not limited to the above example. Communication unit 23 may perform communication using a wireless LAN such as Bluetooth (registered trademark) or Wi-Fi (registered trademark). The frequency used in the wireless communication is, for example, a frequency ranging from 421 MHz and 2483.5 MHz, inclusive.

Communication unit 23 performs wireless communication with control device 10 to obtain correction time from control device 10. The obtained correction time is stored in storage 24 via controller 22. Communication unit 23 further receives a turn-on instruction from control device 10. The received turn-on instruction is output to controller 22.

Upon receipt of the turn-on instruction, communication unit 23 transmits a response to the turn-on instruction by performing carrier sense. Specifically, communication unit 23 transmits an ACK response to control device 10 by performing carrier sense.

In Embodiment 1, communication unit 23 performs wireless communication using only a predetermined frequency. In other words, communication unit 23 is prohibited from using so-called frequency-hopping.

Storage 24 is a memory for storing correction time 32 obtained from control device 10. Storage 24 is, for example, a non-volatile memory.

[Turn-on Operation]

Now, details of turn-on operations in lighting system 1 according to Embodiment 1 will be described with reference to FIG. 3 and FIG. 4.

Figure 3:
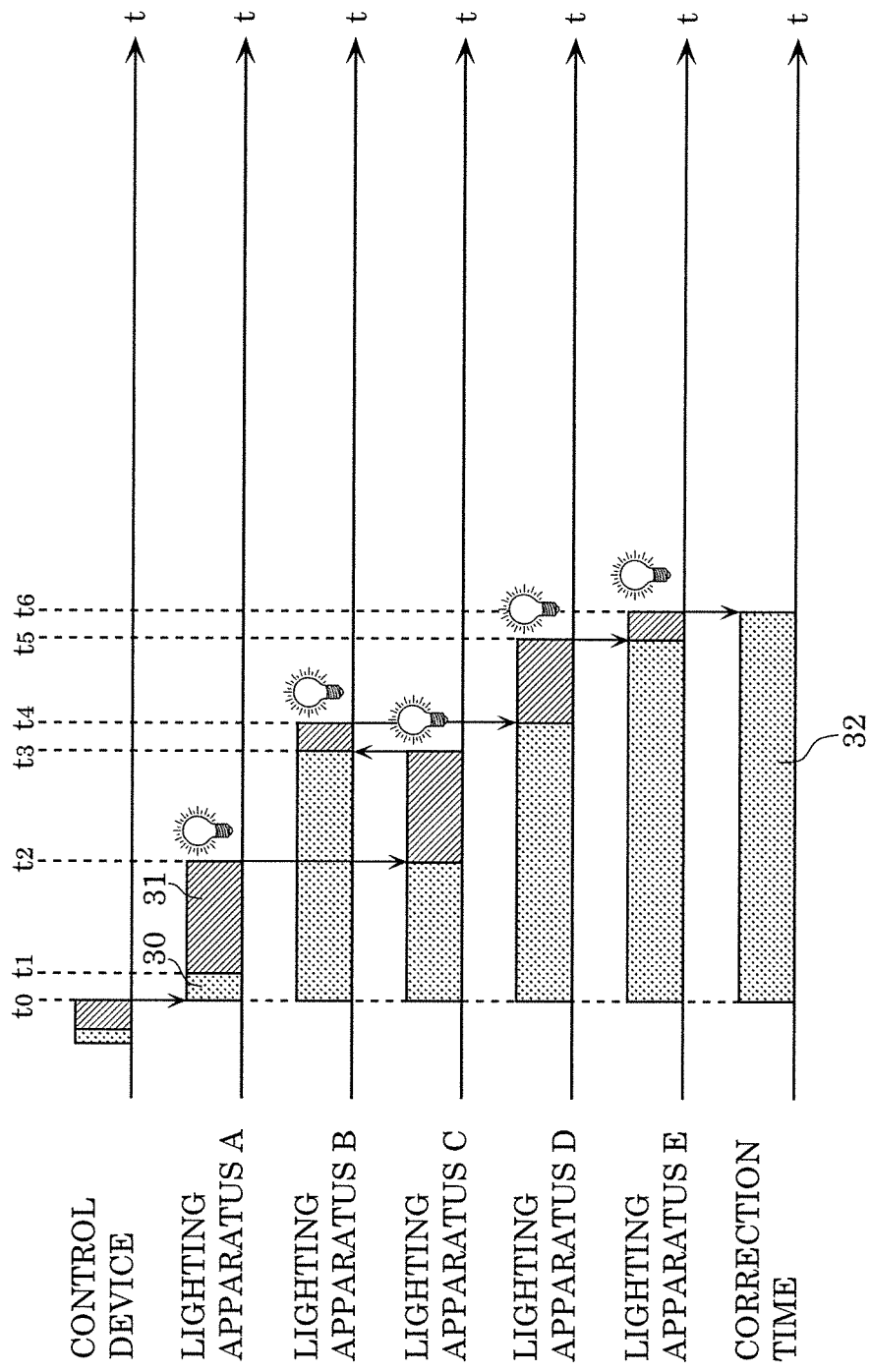
FIG. 3 illustrates lighting operations of a plurality of lighting apparatuses in a lighting system according to a comparative example of Embodiment 1 of the present disclosure.

FIG. 3 illustrates turn-on operations of lighting apparatuses 20 in lighting system 1 according to a comparative example of Embodiment 1. FIG. 4 illustrates turn-on operations of lighting apparatuses 20 in lighting system 1 according to Embodiment 1.

In the lighting system according to the comparative example, correction time is not calculated in advance, and each of lighting apparatuses 20 turns on light emitting unit 21 each time lighting apparatus 20 receives a turn-on instruction. Specifically, each lighting apparatus 20 receives a turn-on instruction, transmits an ACK response to the received turn-on instruction, and then turns on light emitting unit 21.

In order to transmit an ACK response to control device 10, each lighting apparatus 20 performs carrier sense to transmit the ACK response at the transmittable timing. In other words, an ACK response cannot be transmitted while another lighting apparatus 20 is performing communication with control device 10.

Accordingly, as FIG. 3 illustrates, each lighting apparatus 20 turns on light emitting unit 21 after passage of CS latency 30 and turn-on processing time 31 from time t0 at which a turn-on instruction is received from control device 10 (for example, lighting apparatus A turns on light emitting unit 21 at time t2). CS latency 30 is an example of communication latency, and is latency caused by carrier sense. Turn-on processing time 31 is time required for transmitting an ACK response and turning on light emitting unit 21.

In the example in FIG. 3, control device 10 simultaneously transmits a turn-on instruction using multicast at time t0. Hence, lighting apparatuses 20 (lighting apparatuses A to E) approximately simultaneously receives the turn-on instruction at time t0, and performs carrier sense attempting to transmit, to control device 10, an ACK response indicating the receipt of the turn-on instruction.

As a result of the carrier sense performed by each lighting apparatus 20, as FIG. 3 illustrates, lighting apparatus A successfully performs carrier sense at time t1, and turns on light emitting unit 21 at time t2. The rest of lighting apparatuses (lighting apparatuses B to E) which have failed in performing carrier sense repeatedly perform carrier sense till wireless communication is established with control device 10.

At time t2, lighting apparatus A is turned on and wireless communication between lighting apparatus A and control device 10 ends, and thus, next, for example, lighting apparatus C successfully performs carrier sense. Accordingly, lighting apparatus C is turned on at time t3. Subsequently, in a similar manner, lighting apparatus B is turned on at time t4, lighting apparatus D is turned on at time t5, and lighting apparatus E is turned on at time t6.

In this manner, lighting apparatuses A to E are turned on at different times due to the influence from the latency caused by carrier sense. In other words, in the lighting system according to the comparative example, lighting apparatuses 20 cannot be simultaneously turned on.

Figure 4:
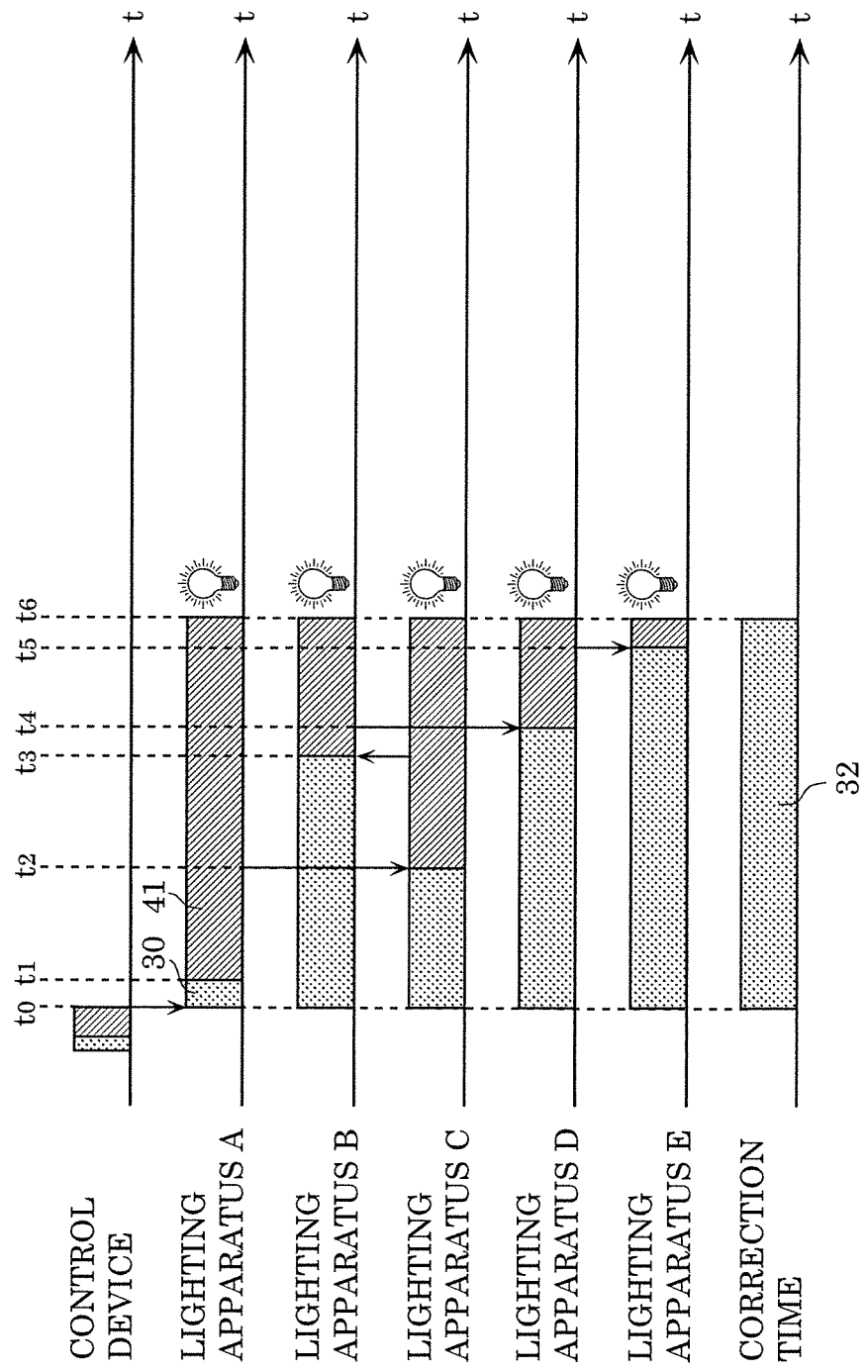
FIG. 4 illustrates lighting operations of the lighting apparatuses in the lighting system according to Embodiment 1 of the present disclosure.

In contrast, in Embodiment 1, as FIG. 4 illustrates, each lighting apparatus 20 transmits an ACK response, waits for standby time 41 which is a time period calculated by subtracting CS latency 30 from correction time 32, and turns on light emitting unit 21. Here, correction time 32 is specifically a time period from time t0 to time t6. T0 is when lighting apparatus 20, which is turned on last (lighting apparatus E in FIG. 3) among lighting apparatuses 20 to be simultaneously turned on, receives the turn-on instruction. T6 is when lighting apparatus E is actually turned on.

In Embodiment 1, correction time calculator 13 in control device 10 calculates correction time 32. Specifically, correction time calculator 13 calculates, as correction time 32, a value obtained by subtracting time t0 at which communication unit 14 transmits the turn-on instruction from time t6 at which communication unit 14 receives the last ACK response.

Correction time calculator 13 is capable of determining whether the received ACK response is the last one or not by, for example, registering the number of lighting apparatuses 20 in advance. In other words, as FIG. 4 illustrates, in the case where five lighting apparatuses 20 are to be simultaneously turned on, correction time calculator 13 is capable of determining that the fifth ACK response received is the last ACK response.

As FIG. 3 and FIG. 4 illustrate, each lighting apparatus 20 has different CS latency 30. Accordingly, in each lighting apparatus 20, controller 22 calculates standby time 41 based on correction time 32 stored in storage 24. Specifically, controller 22 calculates, as standby time 41, a value obtained by subtracting CS latency 30 from correction time 32. CS latency 30 is calculated by subtracting time t0 at which a turn-on instruction is received from the time (such as time t2) at which carrier sense is successfully performed.

In each lighting apparatus 20, controller 22 calculates standby time 41 each time carrier sense is successfully performed, and waits for standby time 41 from the time at which carrier sense is successfully performed. Controller 22 turns on light emitting unit 21 after passage of standby time 41.

In this manner, as FIG. 4 illustrates, lighting apparatuses 20 is capable of simultaneously turning on light emitting units 21 at time t6.

[Communication Distance and Success Rate of ACK Response]

Subsequently, a relationship between communication distance and success rate of ACK response in lighting system 1 according to Embodiment 1 will be described with reference to FIG. 5 and FIG. 6.

Figure 5:
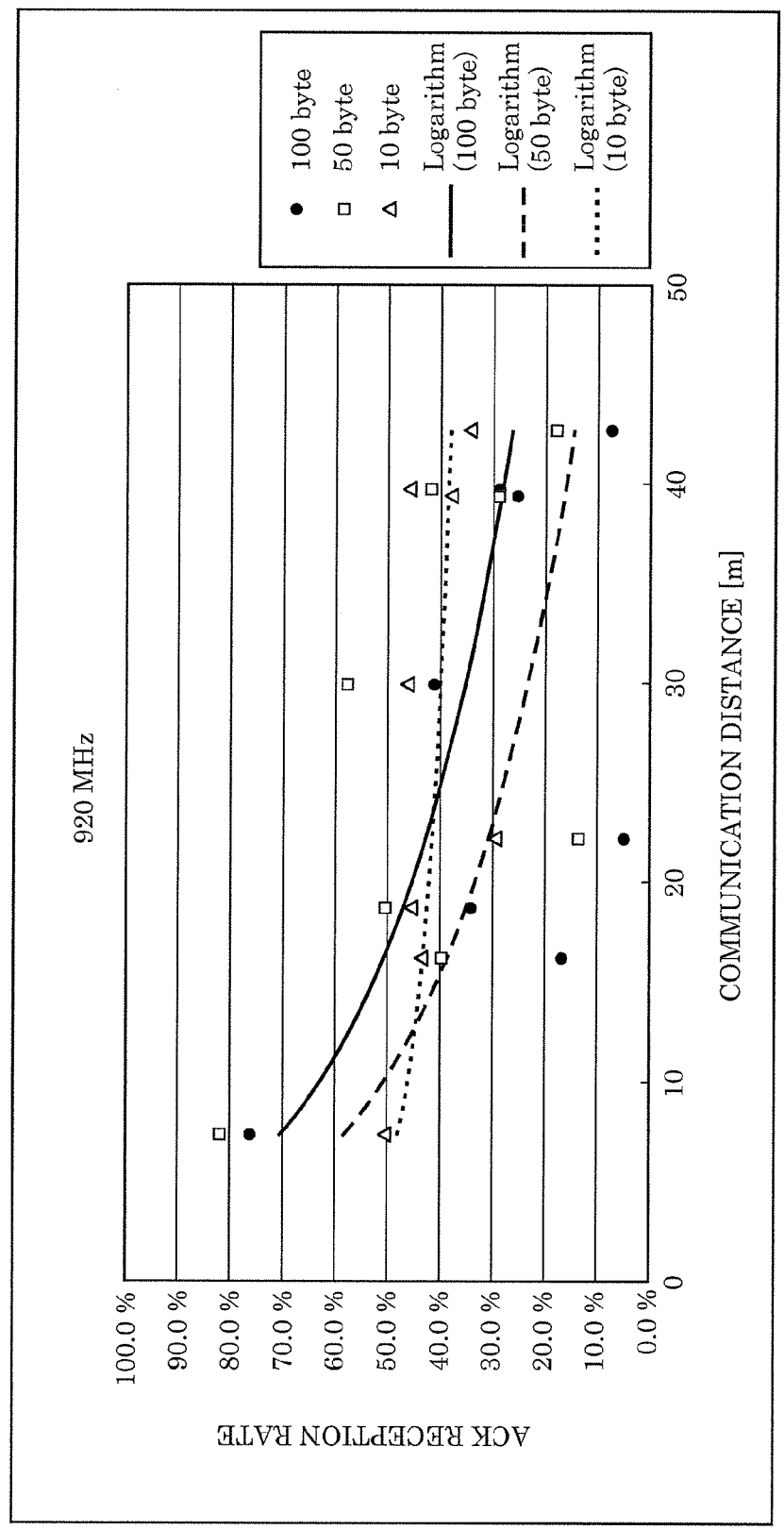
FIG. 5 illustrates a relationship between communication distance and ACK reception rate in the use of a wireless signal of 920 MHz band in the lighting system according to Embodiment 1 of the present disclosure.

FIG. 5 illustrates a relationship between communication distance and ACK reception rate in the use of a wireless signal of 920 MHz band in lighting system 1 according to Embodiment 1. FIG. 6 illustrates a relationship between communication distance and ACK reception rate in the use of a wireless signal of 2.4 GHz band in lighting system 1 according to Embodiment 1.

Figure 6:
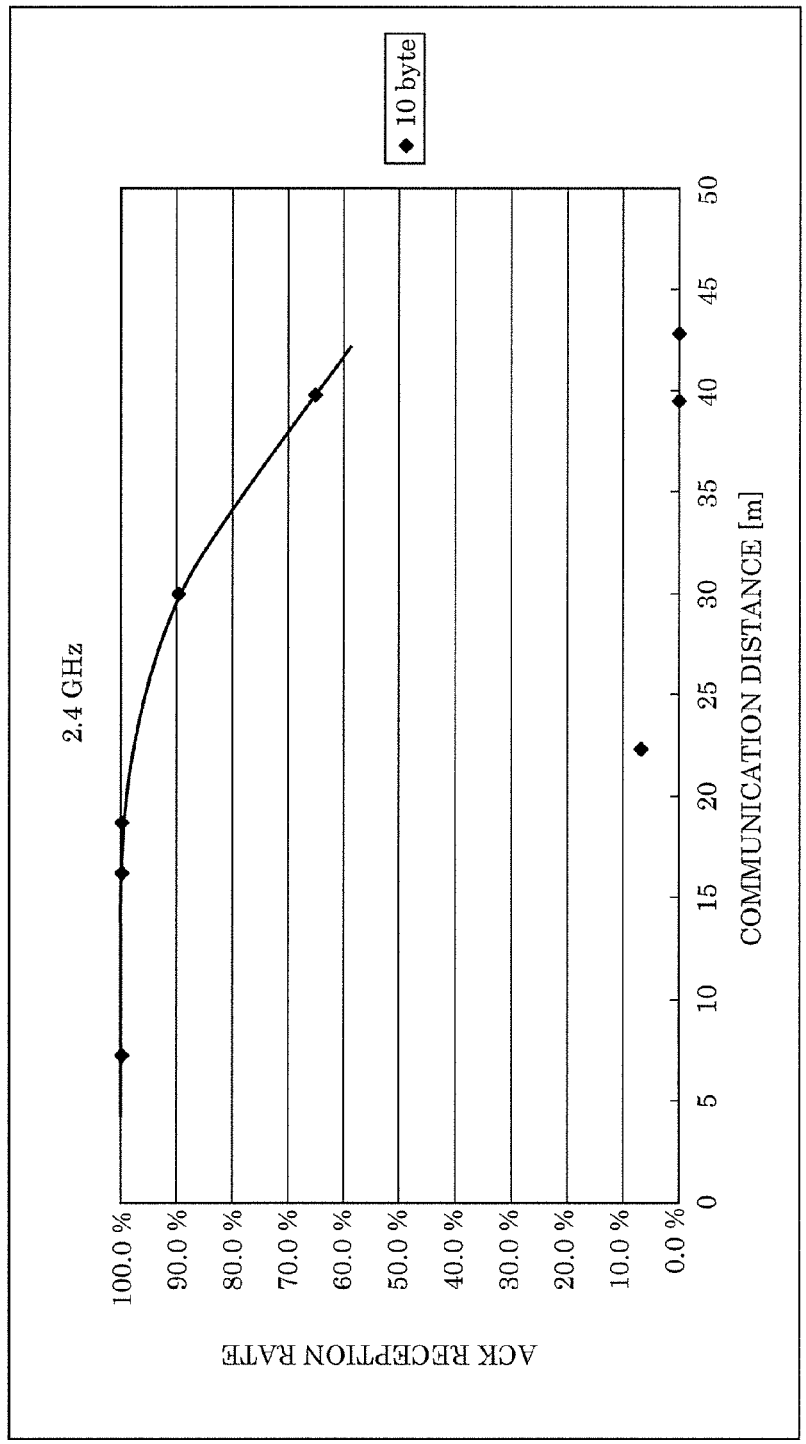
FIG. 6 illustrates a relationship between communication distance and ACK reception rate in the use of a wireless signal of 2.4 GHz band in the lighting system according to Embodiment 1 of the present disclosure.

In FIG. 5 and FIG. 6, the horizontal axes indicate communication distance, and vertical axes indicate ACK reception rate. The communication distance is a distance between control device 10 and lighting apparatus 20. The ACK reception rate is a rate at which control device 10 has received ACK responses using unicast to a broadcasted command, that is, a rate of successful communication.

As FIG. 5 illustrates, in the case of wireless communication using a frequency of 920 MHz, the ACK reception rate tends to decrease with an increase in communication distance. This tendency does not depend on data length. As FIG. 6 illustrates, in the case of wireless communication using a frequency of 2.4 GHz, too, the ACK reception rate tends to decrease with an increase in communication distance.

In the case of the frequency of 2.4 GHz, however, the ACK reception rate is approximately 100% when the communication distance ranges from 0 m to 20 m. When the communication distance exceeds 30 m, the ACK reception rate significantly decreases. Hence, in lighting system 1 according to Embodiment 1, making the communication distance less than or equal to 30 m leads to an ACK reception rate greater than or equal to 90% approximately, resulting in an increase in communication accuracy. Specifically, in Embodiment 1, it may be that the distance between control device 10 and each lighting apparatus 20 is less than or equal to 30 m. It is preferable that the frequency used in wireless communication is greater than or equal to 2.4 GHz.

In lighting system 1 according to Embodiment 1, the frequency of 920 MHz band can also be used in wireless communication. In this case, as FIG. 5 illustrates, shorter communication distance is preferable in the use of frequency of 920 MHz band because the ACK reception rate decreases more significantly with an increase in communication distance than the case of the frequency of 2.4 GHz band.

For example, the communication distance can be reduced by connecting control device 10 and lighting apparatuses 20 in a mesh topology instead of start topology. In other words, communication unit 23 in each lighting apparatus 20 may be capable of performing wireless communication with another lighting apparatus 20. With this, lighting apparatus 20 located far from control device 10 is capable of performing accurate communication with control device 10 by being routed through nearby another lighting apparatus 20.

[Communication Distance and Communication Time]

Subsequently, reproducibility of a relationship between communication distance and communication time in lighting system 1 according to Embodiment 1 will be described with reference to FIG. 7A and FIG. 7B.

Figure 7A:
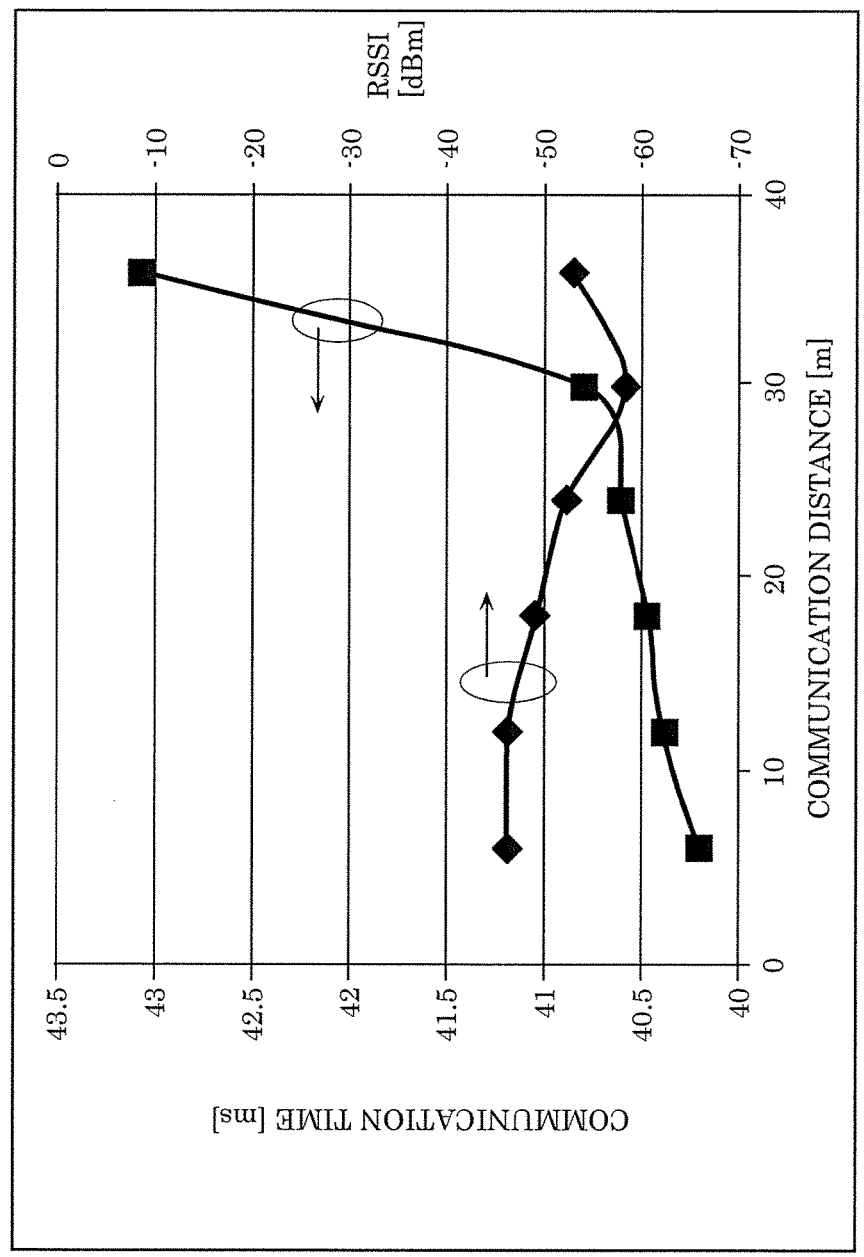
FIG. 7A illustrates communication time and received signal strength indicator (RSSI) relative to communication distance in the lighting system according to Embodiment 1 of the present disclosure.
Figure 7B:
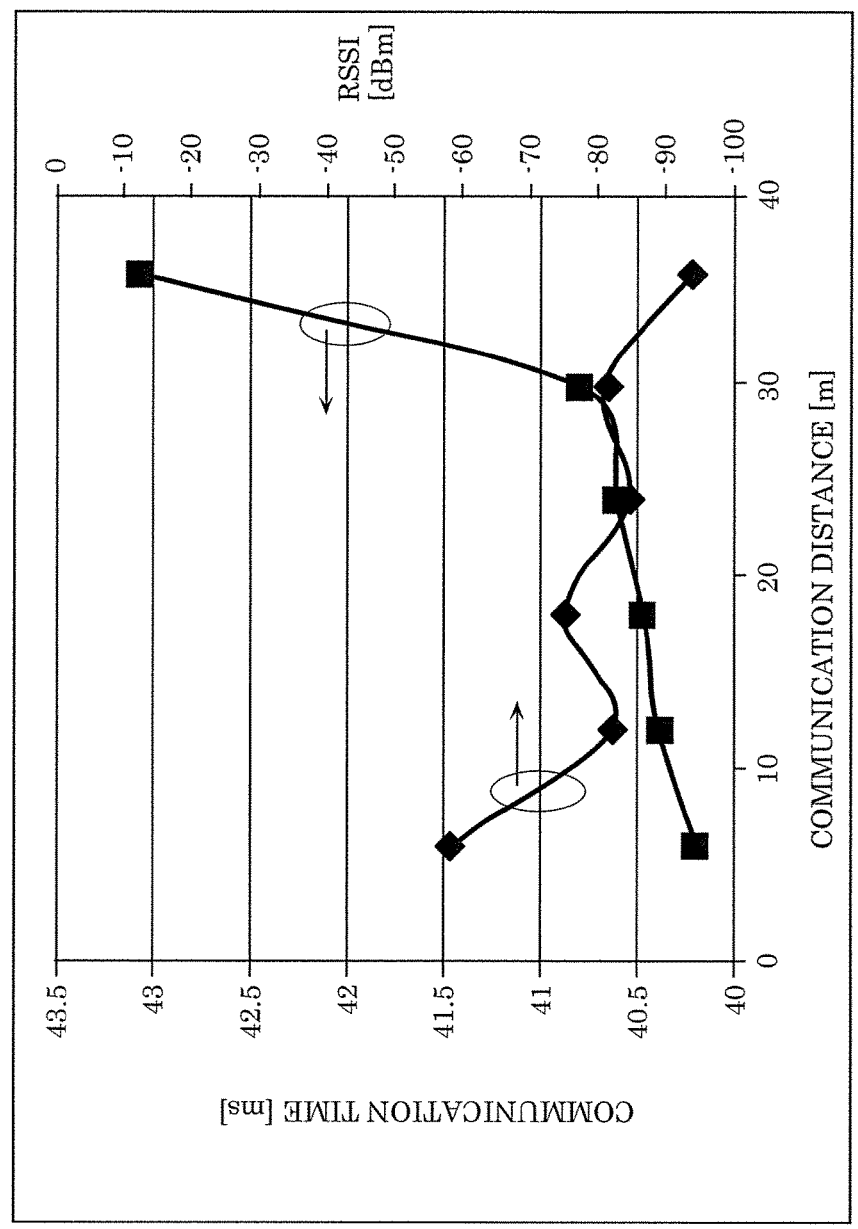
FIG. 7B illustrates communication time and RSSI relative to communication distance in the lighting system according to Embodiment 1 of the present disclosure.

FIG. 7A and FIG. 7B each illustrate communication time and received signal strength relative to communication distance in the lighting system according to Embodiment 1.

In FIG. 7A and FIG. 7B, the horizontal axes indicate communication distance, and vertical axes indicate communication time and received signal strength indicator (RSSI). The communication distance is a distance between control device 10 and lighting apparatus 20. The communication time is a time period taken from when control device 10 transmits a command to when control device 10 receives an ACK response. Here, the transmitting a command and receiving an ACK response were performed using unicast. The RSSI indicates the strength of radio waves when a wireless signal transmitted from control device 10 is received.

FIG. 7A shows average values of the communication time and the RSSI obtained when data of 100 bytes was successively transmitted 100 times in one cycle. FIG. 7B shows average values of the communication time and the RSSI obtained when data of 100 bytes was successively transmitted 100 times in two cycles.

As FIG. 7A and FIG. 7B illustrate, the RSSI tends to decrease with an increase in communication distance, but the reproducibility thereof is low. For example, in FIG. 7A, the RSSI increases when the communication distance is 30 m and 37 m, whereas in FIG. 7B, the RSSI decreases when the communication distance is 30 m and 37 m.

On the other hand, as FIG. 7A and FIG. 7B illustrate, the communication time tends to gradually increase when the communication distance ranges from 0 m to 30 m, and significantly increases when the communication distance exceeds 30 m. In such a manner, approximately the same tendency can be seen relative to the communication time in both FIG. 7A and FIG. 7B, and its reproducibility is high.

Accordingly, as described above, by using the correction time calculated based on the communication time, turn-on of lighting apparatuses 20 can be accurately controlled.

[Operation of Lighting System]

Next, an operation of lighting system 1 according to Embodiment 1 will be described.

The operation of lighting system 1 according to Embodiment 1 includes calculation processing of correction time and simultaneous turn-on processing using the calculated correction time. In the following description, first, calculation processing of correction time will be described with reference to FIG. 8.

[Calculation Processing of Correction Time]

FIG. 8 is a sequence diagram of calculation processing of correction time in lighting system 1 according to Embodiment 1. Here, a description is given of an example where lighting system 1 includes control device 10 and three lighting apparatuses 20a to 20c.

First, control device 10 transmits a turn-on instruction to lighting apparatuses 20a to 20c (S10). Specifically, command generator 12 generates a turn-on instruction, and communication unit 14 transmits the generated turn-on instruction to lighting apparatuses 20a to 20c using multicast.

Each of lighting apparatuses 20a to 20c receives the turn-on instruction, and performs carrier sense to transmit an ACK response (S20). As a result, for example, lighting apparatus 20a successfully performs carrier sense, and transmits an ACK response to control device 10 (S20a). Lighting apparatus 20a then turns on light emitting unit 21 (S22a). At this point, since correction time has not been calculated yet, and has not been stored in storage 24 of lighting apparatus 20a, lighting apparatus 20a turns on light emitting unit 21 immediately after completion of transmission of the ACK response.

Next, lighting apparatus 20b successfully performs carrier sense, and transmits an ACK response to control device 10 (S20b). Lighting apparatus 20b then turns on light emitting unit 21 (S22b).

Next, lighting apparatus 20c successfully performs carrier sense, and transmits an ACK response to control device 10 (S20c). Lighting apparatus 20c then turns on light emitting unit 21 (S22c).

Next, control device 10 calculates correction time (S12). Specifically, correction time calculator 13 calculates correction time based on communication delay between control device 10 and respective lighting apparatuses 20a to 20c. For example, correction time calculator 13 calculates, as correction time, a difference between the time at which the turn-on instruction was transmitted and the time at which the last ACK response was received.

Next, control device 10 transmits the calculated correction time to lighting apparatuses 20a to 20c (S14). Specifically, communication unit 14 transmits the calculated correction time to lighting apparatuses 20a to 20c using multicast.

Each of lighting apparatuses 20a to 20c receives the correction time, and stores the received correction time into storage 24 (S24).

By causing each lighting apparatus 20a to 20c to store the correction time into storage 24 as described above, simultaneous turn-on can be performed using the correction time upon receipt of a subsequent turn-on instruction.

[Simultaneous Turn-on Processing]

Figure 9:
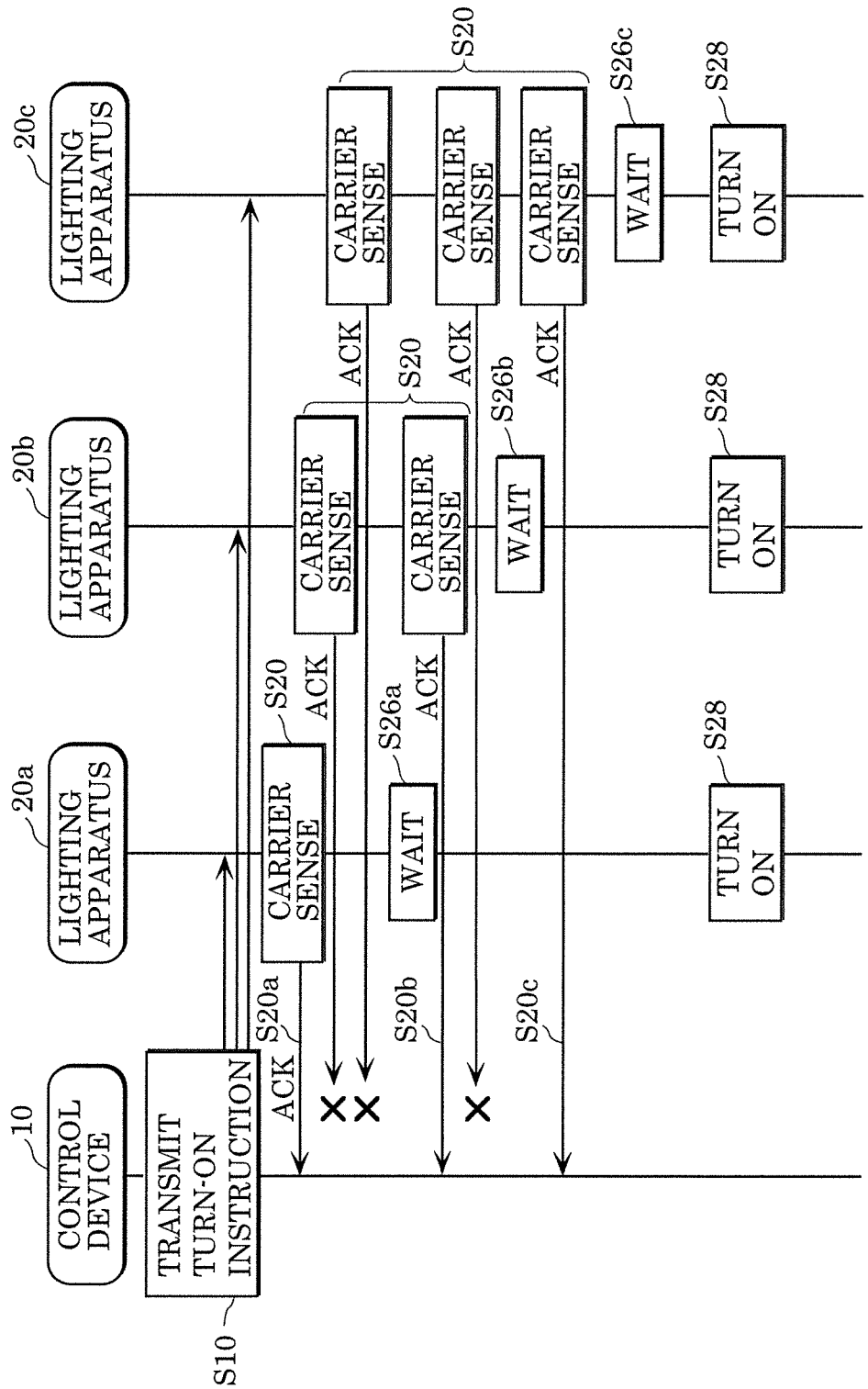
FIG. 9 is a sequence diagram of simultaneous turn-on processing in the lighting system according to Embodiment 1 of the present disclosure.

Next, simultaneous turn-on processing will be described with reference to FIG. 9. FIG. 9 is a sequence diagram of simultaneous turn-on processing in lighting system 1 according to Embodiment 1.

First, control device 10 transmits a turn-on instruction to lighting apparatuses 20a to 20c (S10). Specifically, command generator 12 generates a turn-on instruction, and communication unit 14 transmits the generated turn-on instruction to lighting apparatuses 20a to 20c using multicast.

Each of lighting apparatuses 20a to 20c receives the turn-on instruction, and performs carrier sense to transmit an ACK response (S20). As a result, for example, lighting apparatus 20a successfully performs carrier sense, and transmits an ACK response to control device 10 (S20a). Lighting apparatus 20a then waits without turning on light emitting unit 21 (S26a). Specifically, controller 22 calculates standby time 41 based on the correction time and the time at which the ACK response was transmitted, and waits without turning on light emitting unit 21 till passage of standby time 41 from the time at which the ACK response was transmitted.

Next, lighting apparatus 20b successfully performs carrier sense, and transmits an ACK response to control device 10 (S20b). Lighting apparatus 20b calculates standby time 41 and waits in a similar manner to lighting apparatus 20a (S26b).

Next, lighting apparatus 20c successfully performs carrier sense, and transmits an ACK response to control device 10 (S20c). Lighting apparatus 20c calculates standby time 41 and waits (S26c).

Each of lighting apparatuses 20a to 20c turns on light emitting unit 21 after passage of its own standby time 41 (S28). Each standby time 41 is a different value depending on the time at which the ACK response was transmitted as illustrated in FIG. 4. Specifically, standby time 41 is calculated such that light emitting unit 21 is turned on after passage of the correction time from when control device 10 transmitted the turn-on instruction. Accordingly, as FIG. 4 illustrates, lighting apparatuses 20a to 20c can be simultaneously turned on.

[Conclusion]

As described above, lighting apparatus 20 according to Embodiment 1 is one of a plurality of lighting apparatuses 20 each capable of performing wireless communication with control device 10. Lighting apparatus 20 includes light emitting unit 21; controller 22 which controls turn-on of light emitting unit 21; and communication unit 23 which performs wireless communication with control device 10 to obtain, from control device 10, correction time which is based on communication delay between control device 10 and each lighting apparatus 20. Communication unit 23 further obtains a turn-on instruction for turning on light emitting unit 21 from control device 10, and upon obtainment of the turn-on instruction, transmits a response to the turn-on instruction to control device 10. Controller 22 turns on light emitting unit 21 after passage of a time period from when the response was transmitted to control device 10. The time period is calculated by subtracting communication latency from the correction time.

Accordingly, since each light emitting unit 21 is turned on after passage of a time period calculated by subtracting each communication latency from the correction time, all lighting apparatuses 20 can be simultaneously turned on.

For example, control device 10 and lighting apparatuses 20 are connected in a star topology. Control device 10 transmits a turn-on instruction to lighting apparatuses 20 using multicast. Communication unit 23 performs carrier sense to transmit a response to control device 10. Communication latency is latency caused by carrier sense.

With this, since information indicating receipt of the turn-on instruction (specifically, an ACK response) is transmitted by performing carrier sense, latency due to carrier sense occurs when there are a plurality of lighting apparatuses 20. Accordingly, in such a case, the advantageous effects produced by turn-on control using the correction time according to Embodiment 1 can be more effectively used.

Moreover, for example, communication unit 23 is capable of performing wireless communication with another one of lighting apparatuses 20.

Accordingly, even if a distance between control device 10 and lighting apparatus 20 is long, wireless communication can be performed using another lighting apparatus 20 located therebetween.

Moreover, for example, lighting apparatuses 20 are, for example, located within a 30 m radius from control device 10.

With this, accurate wireless communication can be performed between control device 10 and lighting apparatuses 20.

Moreover, for example, the correction time is calculated based on the communication time between control device 10 and lighting apparatus 20 requiring the longest communication time among lighting apparatuses 20.

With this, the correction time is calculated based on the longest communication time. Hence, control can be performed such that all of lighting apparatuses 20 have completed wireless communication at the timing at which lighting apparatuses 20 are to be simultaneously turned on. In other words, lighting apparatuses 20 can be simultaneously turned on more reliably.

Moreover, for example, communication unit 23 performs wireless communication using only a predetermined frequency.

With this, since so-called frequency-hopping is prohibited, wireless communication cannot be performed using another frequency even if carrier sense fails. In other words, one or more lighting apparatuses 20 always have latency caused by carrier sense, which prohibits lighting apparatuses 20 from being simultaneously turned on.

However, since lighting apparatuses 20 according to Embodiment 1 perform turn-on control using correction time, lighting apparatuses 20 can be simultaneously turned on. Accordingly, when the frequency-hopping is prohibited, the advantageous effects produced by turn-on control using the correction time according to Embodiment 1 can be more effectively used.

Moreover, for example, communication unit 23 performs wireless communication using a frequency ranging from 421 MHz to 2483.5 MHz, inclusive.

With this, for example, wireless communication can be performed using a frequency band permitted in Japan.

Moreover, for example, lighting system 1 according to Embodiment 1 includes control device 10 and a plurality of lighting apparatuses 20 each capable of performing wireless communication with control device 10. Control device 10 includes correction time calculator 13 which calculates correction time which is based on communication delay between control device 10 and each lighting apparatus 20; and communication unit 14 which performs wireless communication with lighting apparatuses 20 to transmit, to lighting apparatuses 20, the correction time and a turn-on instruction for turning on lighting apparatuses 20. Each of lighting apparatuses 20 includes light emitting unit 21, controller 22 which controls turn-on of light emitting unit 21, and communication unit 23 which obtains the correction time and the turn-on instruction from control device 10, and upon obtainment of the turn-on instruction, transmits a response to the turn-on instruction to control device 10. Controller 22 turns on light emitting unit 21 after passage of a time period from when the response was transmitted to control device 10. The time period is calculated by subtracting communication latency from the correction time.

Accordingly, since each light emitting unit 21 is turned on after passage of a time period calculated by subtracting each communication latency from the correction time, all lighting apparatuses 20 can be simultaneously turned on.

Embodiment 2

Next, a lighting apparatus and a lighting system according to Embodiment 2 will be described.

Figure 10:
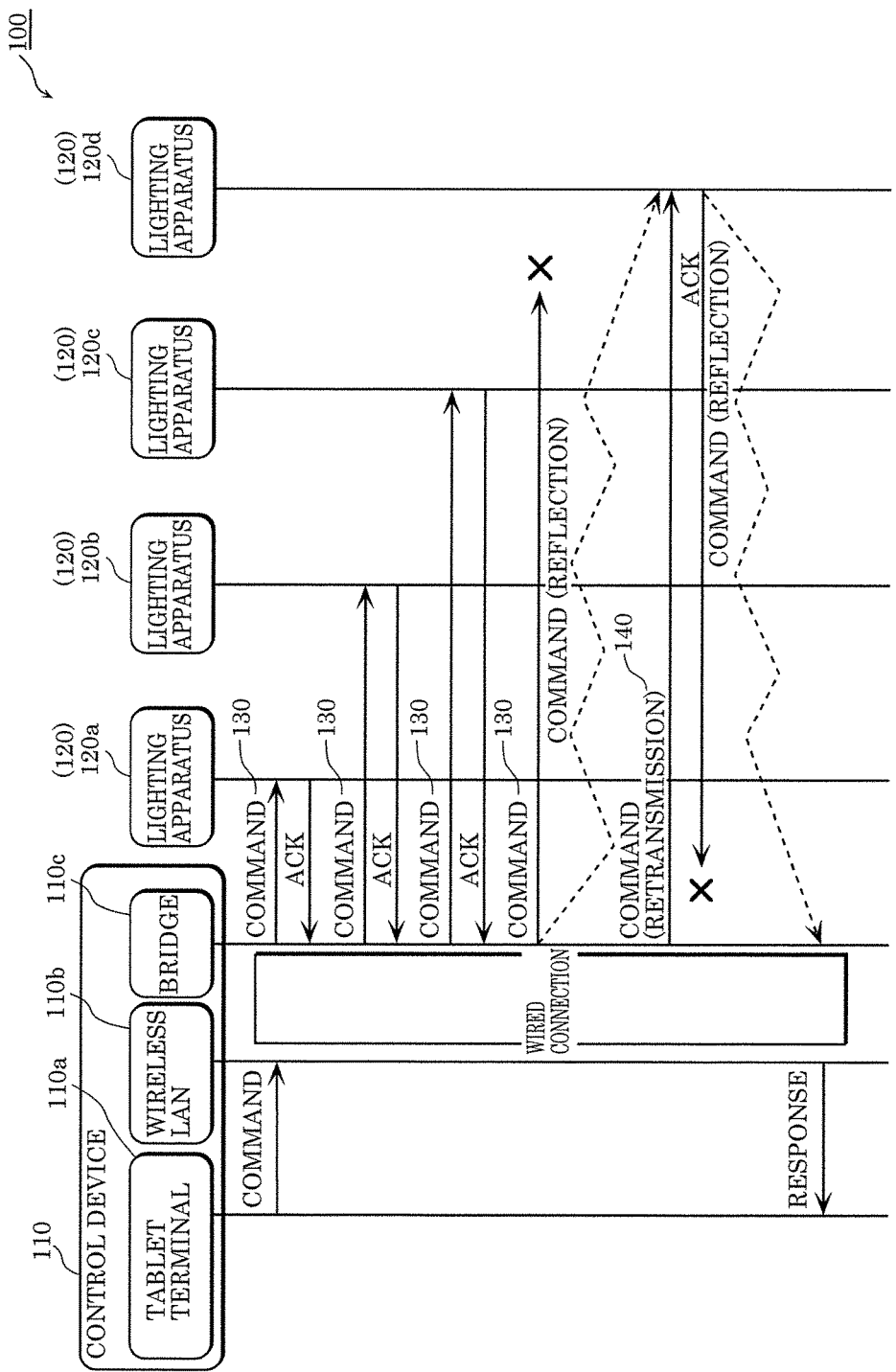
FIG. 10 is a sequence diagram of an operation of a lighting system according to Embodiment 2 of the present disclosure.
Figure 11:
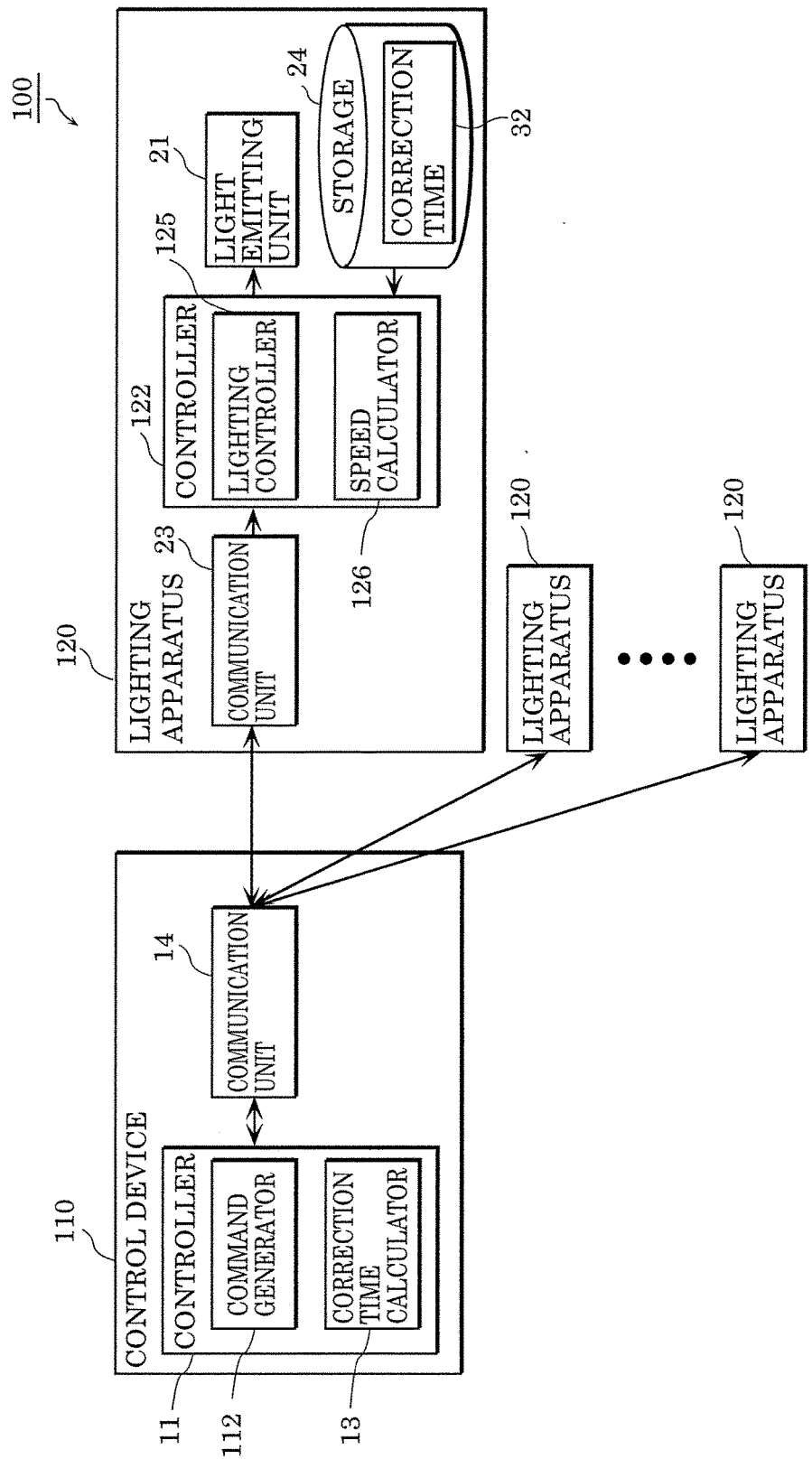
FIG. 11 is a block diagram of a functional configuration of the lighting system according to Embodiment 2 of the present disclosure.

FIG. 10 is a sequence diagram of an operation of lighting system 100 according to Embodiment 2. FIG. 11 is a block diagram of a functional configuration of lighting system 100 according to Embodiment 2. Lighting system 100 includes control device 110 and a plurality of lighting apparatuses 120. Controller 110 and lighting apparatuses 120 respectively correspond to control device 10 and lighting apparatuses 20 according to Embodiment 1.

[Control Device]

First, a configuration of control device 110 will be described.

As FIG. 10 illustrates, control device 110 includes, for example, tablet terminal 110a, wireless LAN 110b, and bridge 110c. A command such as a turn-on instruction or a turn-off instruction is transmitted from tablet terminal 110a to lighting apparatuses 120 via wireless LAN 110b and bridge 110c. A response such as ACK response transmitted from each of lighting apparatuses 120 is transmitted to tablet terminal 110a via bridge 110c and wireless LAN 110b.

Here, a functional configuration of control device 110 will be described with reference to FIG. 11.

As FIG. 11 illustrates, control device 110 is different from control device 10 illustrated in FIG. 2 in that command generator 112 is included instead of command generator 12.

Command generator 112 generates a turn-off instruction in addition to the functions of command generator 12. Depending on the communication status, it may be that the command transmitted from control device 110 is not properly received by lighting apparatuses 120, or that the ACK response transmitted from each lighting apparatuses 120 is not properly received by control device 110. In order to deal with such cases, command generator 112 generates a command for retransmission. Specifically, command generator 112 generates a turn-off instruction for retransmission.

Controller 11 corresponds to tablet terminal 110a, and communication unit 14, for example, corresponds to wireless LAN 110b and bridge 110c.

As FIG. 10 illustrates, bridge 110c transmits a command such as a turn-on instruction or a turn-off instruction to lighting apparatuses 120a to 120d using broadcast. When each of lighting apparatuses 120a to 120d receives the command, each of lighting apparatus 120a to 120d transmits an ACK response to the command to bridge 110c using unicast.

Here, for example, one of lighting apparatuses 120 may fail to properly receive the command. Alternatively, bridge 110c may fail to properly receive the ACK response transmitted from each lighting apparatus 120. In such a case, control device 110 cannot receive the ACK response, and thus, generates and transmits a command for retransmission after a predetermined period.

Such failures in receiving a command or transmitting an ACK response happen due to the surrounding environment. In practice, an ideal environment where waves from control device 110 reaches directly and which is favorable for communication is rare due to obstructions such as building structures, building materials, furniture or home electronics in the room. Actual environment includes areas where radio waves are likely to reach and areas where radio waves are unlikely to reach, due to reflected waves, transmitted waves, diffracted waves, and the like. This may cause failure of transmission and reception of a command or an ACK response.

[Lighting Apparatus]

Next, a configuration of lighting apparatus 120 will be described.

As FIG. 11 illustrates, lighting apparatus 120 is different from lighting apparatus 20 illustrated in FIG. 2 in that controller 122 is included instead of controller 22.

Controller 122 is formed of, for example, a non-volatile memory such as a ROM which stores a program (such as an application program), a CPU which executes the program, or a volatile memory such as a RAM serving as a temporary working area at the time of execution by the CPU. Controller 122 is, for example, a microcontroller.

Controller 122 includes lighting controller 125 and speed calculator 126.

Lighting controller 125 controls turn-on and turn-off of light emitting unit 21. In Embodiment 2, lighting controller 125 controls turn-on and turn-off of light emitting unit 21 based on the turn-on instruction and the turn-off instruction received by communication unit 23 such that dimming rate of light emitting unit 21 becomes a predetermined value ("100" (turn-on) or "0" (turn-off)) at a predetermined speed. For example, lighting controller 125 performs turn-off control of light emitting unit 21 such that the dimming rate of light emitting unit 21 becomes "0" from "100" in 3 to 5 seconds, when communication unit 23 receives a turn-off instruction. When communication unit 23 receives a turn-off instruction for retransmission, lighting controller 125 performs turn-off control of light emitting unit 21 such that the dimming rate becomes "0" at the speed calculated by speed calculator 126.

Lighting controller 125 performs turn-on control of light emitting unit 21 based on correction time, for example, in a similar manner to Embodiment 1. Specific processing is the same as the one described in Embodiment 1.

Speed calculator 126 calculates turn-off speed of light emitting unit 21. The turn-off speed is, specifically, a speed at which the dimming rate of light emitting unit 21 which is on is changed to "0". For example, speed calculator 126 determines a time period taken to turn off light emitting unit 21, divides the current value of the dimming rate of light emitting unit 21 which is on by the determined time, and calculates turn-off speed. The time period taken to turn off light emitting unit 21 is determined based on the turn-off instruction for retransmission received by communication unit 23.

[Turn-Off Instruction]

Figure 12A:
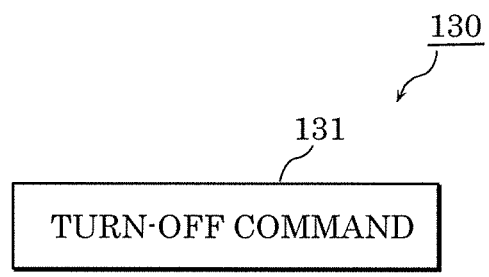
FIG. 12A illustrates an example of a turn-off instruction according to Embodiment 2 of the present disclosure.
Figure 12B:
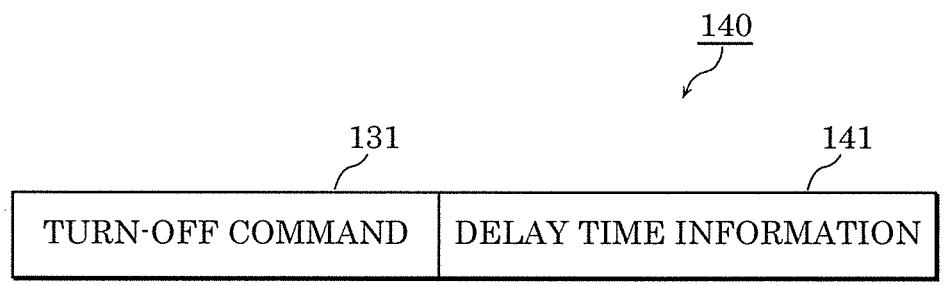
FIG. 12B illustrates an example of a turn-off instruction for retransmission according to Embodiment 2 of the present disclosure.

Here, the turn-off instruction according to Embodiment 2 will be described referring to FIG. 12A and FIG. 12B. FIG. 12A illustrates turn-off instruction 130 according to Embodiment 2. FIG. 12B illustrates turn-off instruction for retransmission 140 according to Embodiment 2.

As FIG. 12A illustrates, turn-off instruction 130 includes turn-off command 131.

Turn-off command 131 is a command for causing lighting apparatus 120 to turn off light emitting unit 21. Lighting controller 125 performs turn-off control of light emitting unit 21 at a predetermined speed upon receipt of turn-off instruction 130.

As FIG. 12B illustrates, turn-off instruction for retransmission 140 includes turn-off command 131 and delay time information 141.

Delay time information 141 indicates delay time taken before turn-off instruction for retransmission 140 is transmitted. Specifically, delay time information 141 indicates, as delay time, a time period taken from when turn-off instruction 130 is transmitted to when turn-off instruction for retransmission 140 is transmitted.

Accordingly, when lighting apparatus 120 receives turn-off instruction for retransmission 140, speed calculator 126 is capable of calculating the turn-off speed based on delay time information 141.

Specifically, first, speed calculator 126 calculates time required to normally turn off light emitting unit 21, based on the normal turn-off speed and the current dimming rate of light emitting unit 21. The normal turn-off speed is a predetermined speed, and is, specifically, a speed at which light emitting unit 21 is turned off when turn-off instruction 130 transmitted first is received.

Next, speed calculator 126 calculates the remaining time before turn-off, by subtracting the time indicated by delay time information 141 from the time required to normally turn-off light emitting unit 21. Lastly, speed calculator 126 calculates the turn-off speed by dividing the current dimming rate of light emitting unit 21 by the remaining time.

[Turn-Off Control]

Figure 13:
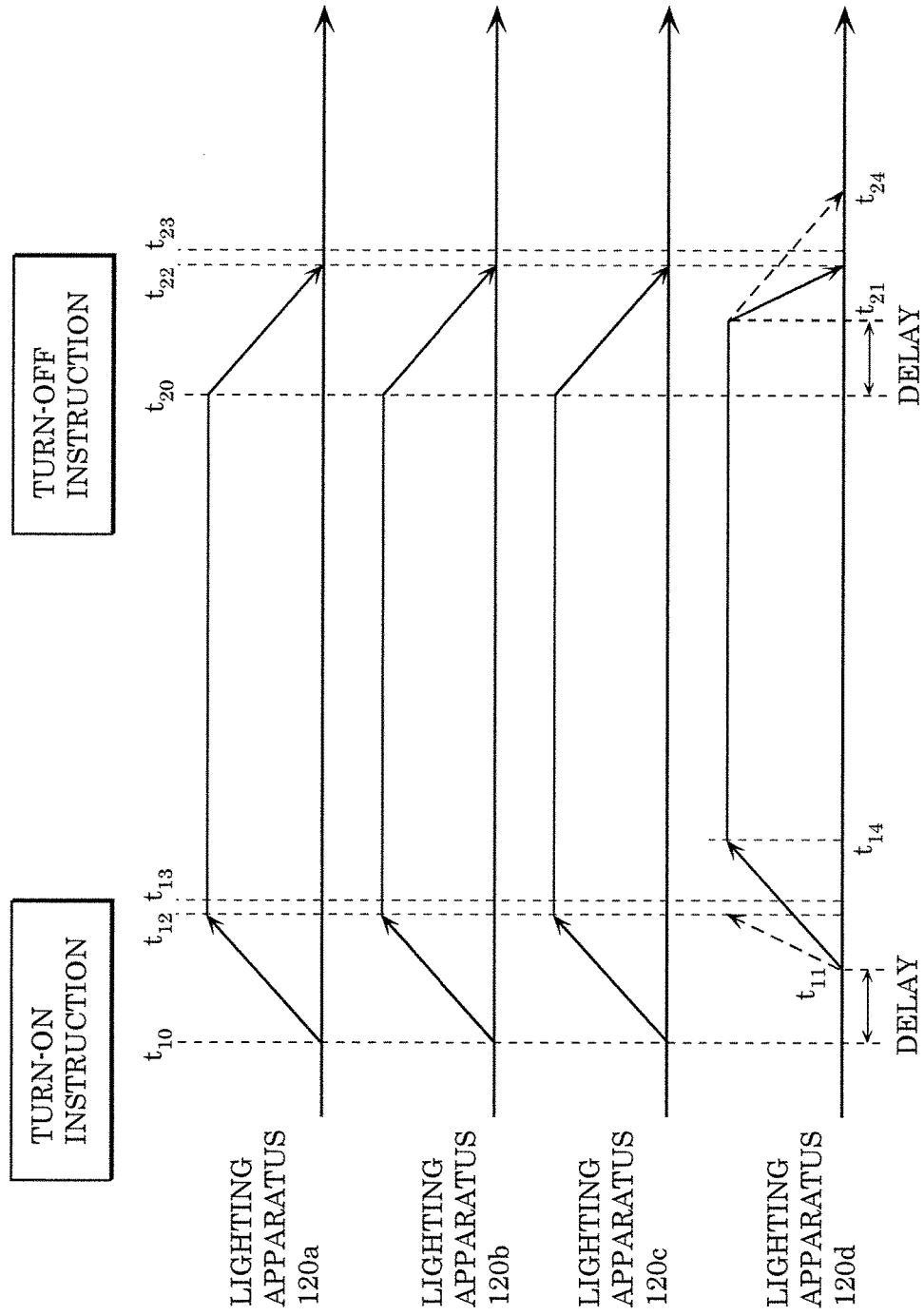
FIG. 13 is a timing chart of turn-on and turn-off operations in the lighting system according to Embodiment 2 of the present disclosure.

The following describes turn-off control performed when turn-off instruction for retransmission 140 is received, with reference to FIG. 13.

FIG. 13 is a timing chart of turn-on and turn-off operations in lighting system 100 according to Embodiment 2. In FIG. 13, the horizontal axis indicates time, and the vertical axis indicates the dimming rate of light emitting unit 21 in each lighting apparatus.

Lighting apparatuses 120a to 120c each receive turn-off instruction 130 from control device 110 at time t20. Each of lighting apparatuses 120a to 120c performs turn-off control of light emitting unit 21 at a predetermined speed (at normal speed) based on turn-off instruction 130. Accordingly, from time t20 to time t22, the dimming rate of each light emitting unit 21 decreases at a predetermined speed.

On the other hand, lighting apparatus 120d cannot receive turn-off instruction 130 properly at time t20, and receives turn-off instruction for retransmission 140 at time t21.

Here, when speed calculator 126 does not calculate the turn-off speed, lighting apparatus 120d performs turn-off control of light emitting unit 21 at a predetermined speed based on turn-off instruction for retransmission 140. Accordingly, from time t21 to time t24, the dimming rate of light emitting unit 21 decreases at a predetermined speed.

In such a manner, lighting apparatus 120d is turned off at different time from lighting apparatuses 120a to 120c.

In contrast, in Embodiment 2, speed calculator 126 calculates turn-off speed. Specifically, speed calculator 126 calculates the remaining time based on delay time information 141 included in turn-off instruction for retransmission 140, and determines the turn-off speed such that the dimming rate of light emitting unit 21 becomes "0" in the calculated remaining time. For example, the delay time indicated by delay time information 141 is a time period between time t20 and time t21, and the remaining time is a time period between time t21 and time t22.

As described in Embodiment 1, too, lighting apparatuses 120 have differences in latency caused by carrier sense. The difference corresponds to the time period between time t22 and time t23 illustrated in FIG. 13, and is, for example, less than or equal to 100 ms. Accordingly, when speed calculator 126 calculates the remaining time, time t23 may be used instead of time t22.

As described above, in Embodiment 2, light emitting unit 21 is turned off based on the turn-off speed calculated by speed calculator 126, and thus, as FIG. 13 illustrates, turn-off time of each of lighting apparatuses 120a to 120d is substantially the same. In other words, lighting apparatuses 120a to 120d can be simultaneously turned off.

Although turn-off control has been described above, turn-on control may be performed in a similar manner. In other words, speed calculator 126 calculates turn-on speed in a similar manner to turn-off speed upon receipt of a turn-on instruction for retransmission, and lighting controller 125 is capable of performing turn-on control of light emitting unit 21 based on the calculated turn-on speed.

Accordingly, for example, although FIG. 13 illustrates an example where lighting apparatus 120d is turned on at time t14, lighting apparatus 120d can be turned on between time t12 and time t13 based on the calculated turn-on speed. Hence, lighting apparatuses 120a to 120d can be simultaneously turned on.

[Operation of Control Device]

Next, an operation of lighting system 100 according to Embodiment 2 will be described.

Figure 14:
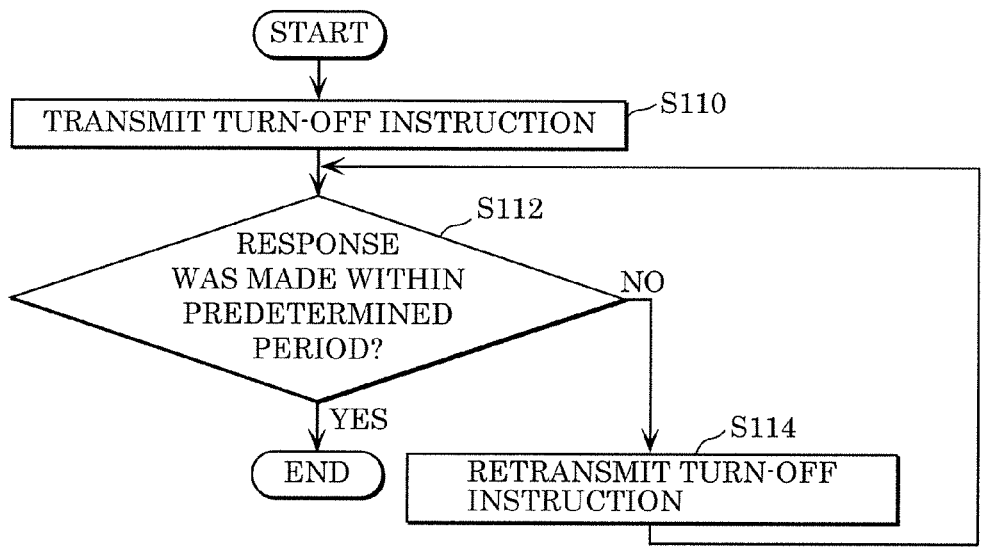
FIG. 14 is a flowchart of an operation of a control device according to Embodiment 2 of the present disclosure.

First, an operation of control device 110 according to Embodiment 2 will be described with reference to FIG. 14. FIG. 14 is a flowchart of an operation of control device 110 according to Embodiment 2.

First, command generator 112 generates turn-off instruction 130, and transmits generated turn-off instruction 130 via communication unit 14 (S110). Specifically, communication unit 14 transmits turn-off instruction 130 generated by command generator 112 to lighting apparatuses 120 using multicast.

Next, command generator 112 determines whether or not communication unit 14 has received responses to turn-off instruction 130 from lighting apparatuses 120 within a predetermined period (S112). Specifically, command generator 112 determines whether or not responses from all of lighting apparatuses 120 have been received.

When responses from one or more lighting apparatuses 120 have not been received (No in S112), command generator 112 generates turn-off instruction for retransmission 140, and transmits turn-off instruction for retransmission 140 via communication unit 14 (S114). For example, communication unit 14 transmits turn-off instruction for retransmission 140 only to lighting apparatus 120 from which a response has not been received.

After transmission of turn-off instruction for retransmission 140, command generator 112 determines whether or not a response has been received within a predetermined period. Subsequently, transmission of turn-off instruction for retransmission 140 (S114) is repeated till a response is received.

When responses from all of lighting apparatuses 120 have been received (Yes in S112), the operation of control device 110 ends.

[Operation of Lighting Apparatus]

Figure 15:
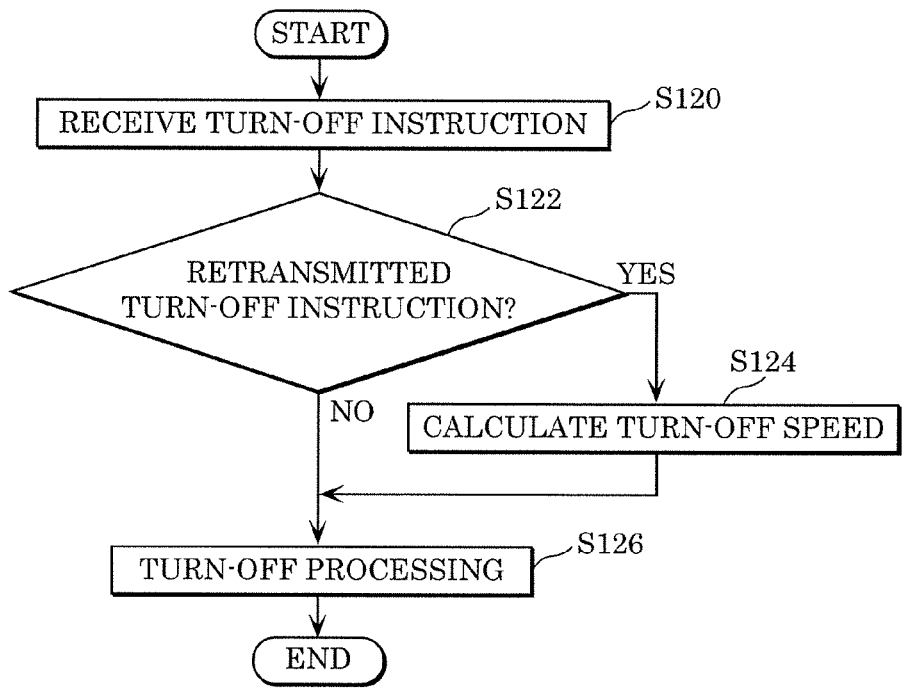
FIG. 15 is a flowchart of an operation of each lighting apparatus according to Embodiment 2 of the present disclosure.

Subsequently, an operation of lighting apparatus 120 according to Embodiment 2 will be described with reference to FIG. 15. FIG. 15 is a flowchart of an operation of lighting apparatus 120 according to Embodiment 2.

First, lighting controller 125 receives turn-off instruction via communication unit 23 (S120). Controller 122 transmits an ACK response to the turn-off instruction to control device 110 via communication unit 23.

Lighting controller 125 determines whether or not the received turn-off instruction is a retransmitted turn-off instruction (S122). Specifically, lighting controller 125 determines whether or not the received turn-off instruction includes delay time information 141. When delay time information 141 is included, the turn-off instruction is the retransmitted turn-off instruction.

When the received turn-off instruction is not the retransmitted turn-off instruction (No in S122), that is, when the turn-off instruction transmitted first is received, light emitting unit 21 is turned off at a predetermined normal turn-off speed (S126).

When the received turn-off instruction is the retransmitted turn-off instruction (Yes in S122), speed calculator 126 calculates the turn-off speed (S124). Specifically, as described above, speed calculator 126 calculates delay time using delay time information 141 included in the turn-off instruction for retransmission. Subsequently, lighting controller 125 turns off light emitting unit 21 at the speed calculated by speed calculator 126 (S126).

When the turn-off instruction for retransmission is received in such a manner, that is, when the turn-off instruction transmitted first has not been received, speed calculator 126 calculates turn-off speed so as to match the turn-off time of other lighting apparatuses 120 (time at which the dimming rate becomes "0"). In this way, lighting system 100 according to Embodiment 2 is capable of simultaneously turning off lighting apparatuses 120.

[Conclusion]

As described above, in lighting system 100 according to Embodiment 2, each lighting apparatus 120 includes speed calculator 126 which calculates turn-off speed upon receipt of a turn-off instruction for retransmission.

With this, when a lighting apparatus receives a turn-off instruction for retransmission, the lighting apparatus finds out that turn-off preparation is delayed compared to the other lighting apparatuses. Hence, by calculating the turn-off speed which is faster than the normal turn-off speed, the lighting apparatus can be turned on together with the turn-off of the other lighting apparatuses. Accordingly, Embodiment 2 allows lighting apparatuses 120 to be simultaneously turned off.

Embodiment 3

Next, a lighting apparatus according to Embodiment 3 will be described.

[Lighting Apparatus]

Figure 16:
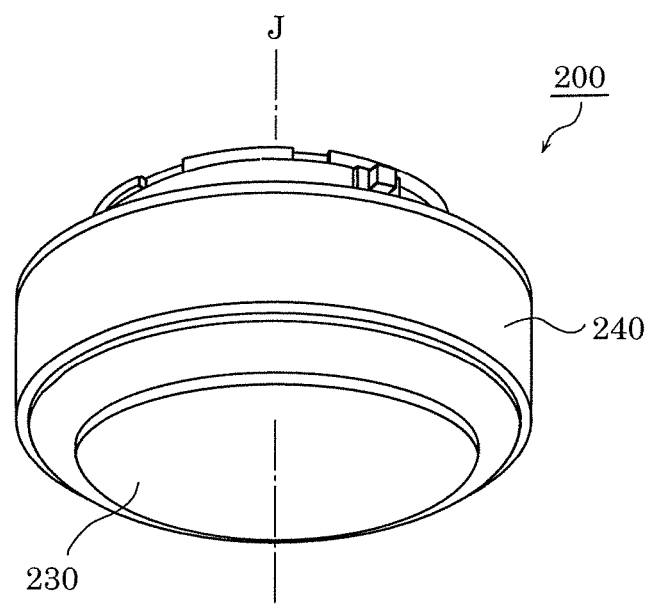
FIG. 16 is an external perspective view of a lighting apparatus according to Embodiment 3 of the present disclosure.

FIG. 16 is an external perspective view of lighting apparatus 200 (LED lamp) according to Embodiment 3. Specifically, FIG. 16 is a perspective view of lighting apparatus 200 viewed from below at an oblique angle.

In FIG. 16, the dashed line indicates lamp axis J of lighting apparatus 200. In Embodiment 3, lamp axis J is an axis serving as the center of rotation (axis of rotation) when lighting apparatus 200 (LED lamp) is attached to a socket of a lighting fixture. Lamp axis J corresponds to the central axis of a base of the LED lamp and the central axis of the socket of the lighting fixture.

As FIG. 16 illustrates, lighting apparatus 200 according to Embodiment 3 is a thin flat LED unit having an overall discus or low-profile shape. Lighting apparatus 200 has an outer chassis including light-transmissive member 230, housing 240, and support base 250. Lighting apparatus 200 has a base configured, for example, as a GX53 base or a GH76p base.

In Embodiment 3, the light emitting side refers to the side from which light is emitted, and is the side of lighting apparatus 200 from which light is taken out. In FIG. 16, the light emitting side is the downside.

Figure 17:
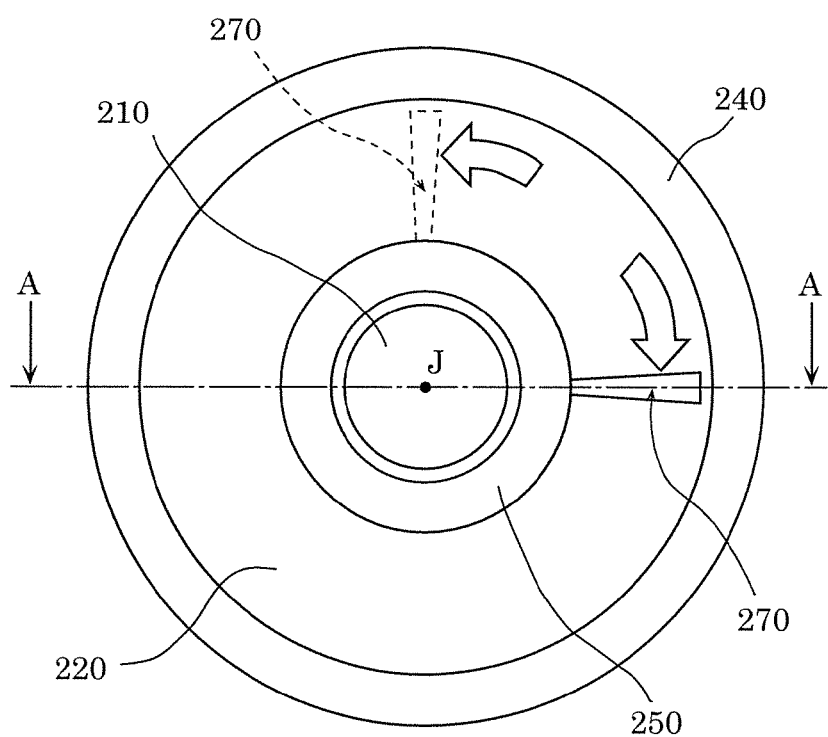
FIG. 17 is a plan view of the lighting apparatus according to Embodiment 3 of the present disclosure, viewed from the light emitting side.
Figure 18:
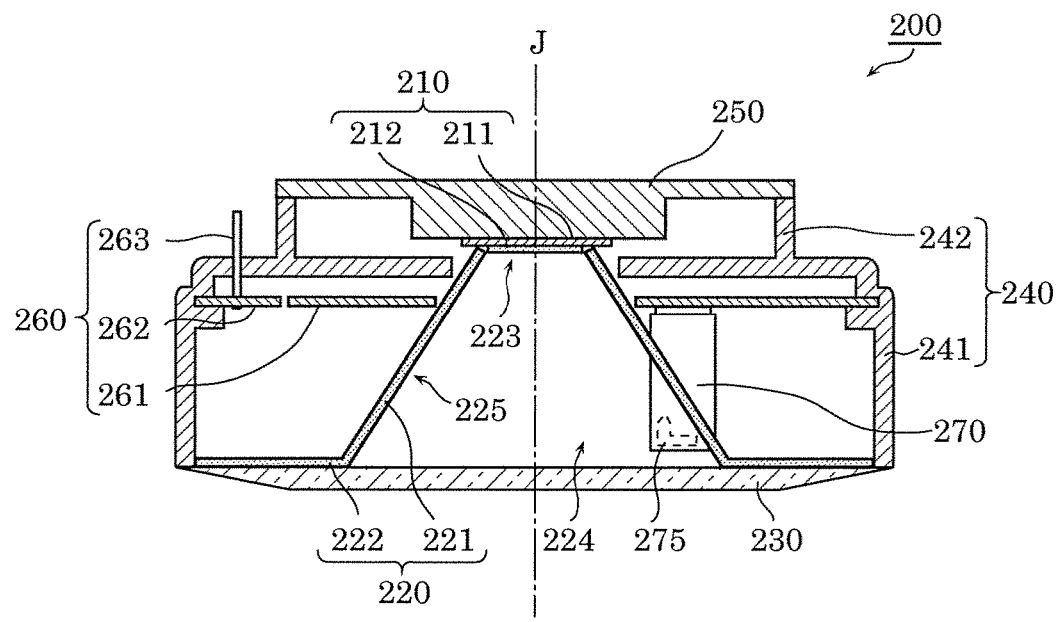
FIG. 18 is a cross-sectional view of the lighting apparatus according to Embodiment 3 of the present disclosure.

FIG. 17 is a plan view of lighting apparatus 200 according to Embodiment 3 viewed from the light emitting side. FIG. 18 is a cross-sectional view of lighting apparatus 200 according to Embodiment 3. Specifically, FIG. 18 illustrates a cross section of lighting apparatus 200 taken along a line passing through the center of lighting apparatus 200 (cross section taken along line A-A in FIG. 17).

As FIG. 17 and FIG. 18 illustrate, lighting apparatus 200 includes light emitting unit 210, reflective member 220, light-transmissive member 230, housing 240, support base 250, lighting board 260, and wireless module 270. In FIG. 17, light-transmissive member 230 is omitted in order to facilitate visualization of inside of housing 240.

The following provides detailed descriptions of each structural member included in lighting apparatus 200, with reference to FIG. 17, FIG. 18, FIG. 19, and FIG. 20.

Figure 19:
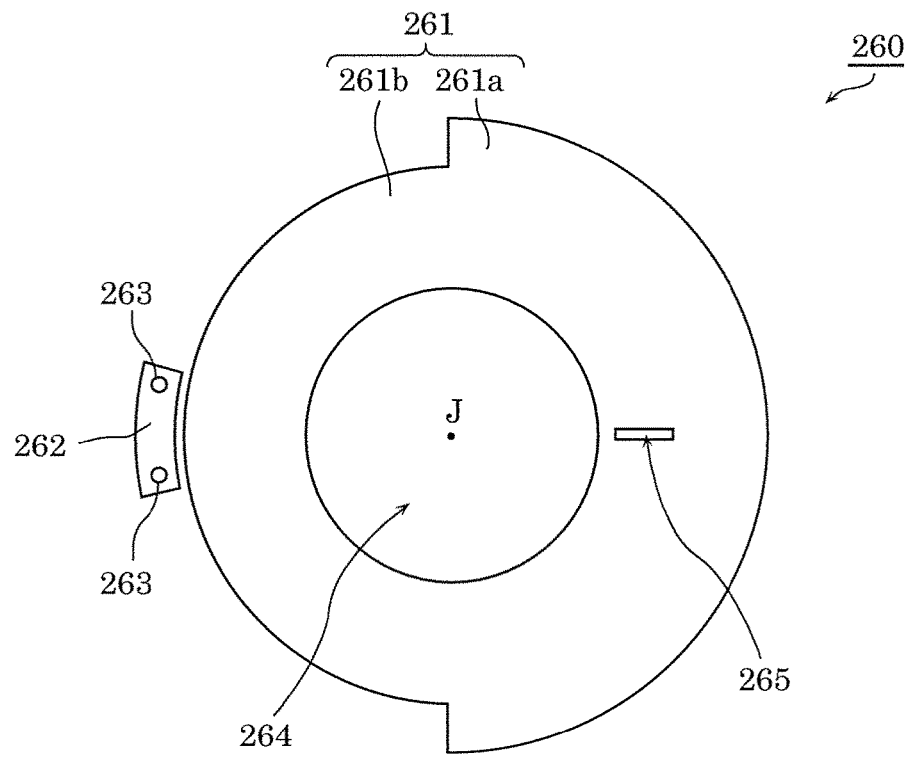
FIG. 19 is a plan view of a lighting board according to Embodiment 3 of the present disclosure.
Figure 20:
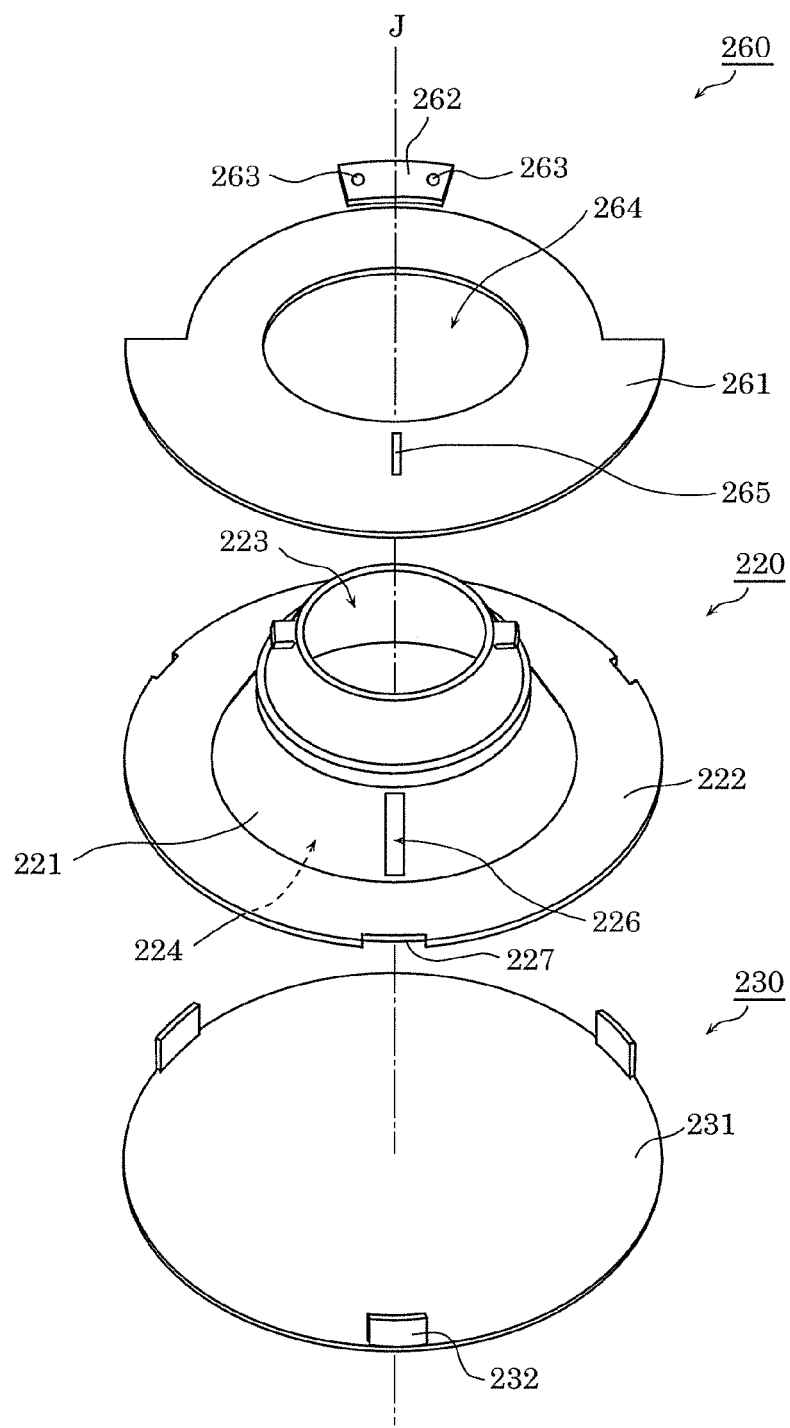
FIG. 20 is a perspective view of the lighting board, a reflective member, and a light-transmissive member according to Embodiment 3 of the present disclosure.

FIG. 19 is a plan view of lighting board 260 according to Embodiment 3. FIG. 20 is a perspective view of lighting board 260, reflective member 220, and light-transmissive member 230 according to Embodiment 3.

[Light Source]

Light emitting unit 210 is a light source of lighting apparatus 200, and is disposed inside housing 240. Light emitting unit 210 is, for example, a light emitting module which includes a light emitting element, and emits light of a predetermined color (wavelength) such as white.

As FIG. 18 illustrates, light emitting unit 210 includes board 211 and LED 212. For example, light emitting unit 210 is a COB LED module including board 211 with a directly mounted bare chips (LEDs 212). Although not illustrated, a metal line having a predetermined shape and for electrically connecting LEDs 212, a terminal for receiving power for turning on LEDs 212, and the like are disposed on board 211.

For example, a ceramic board, a resin board, or a metal based board may be used as board 211. Board 211 may have any shape, such as rectangular shape, polygon shape, round shape in a plan view.

Each LED 212 is an example of the light emitting element, and is a semiconductor light emitting element which emits light in response to predetermined power. In Embodiment 3, LED 212 is a bare chip which emits monochromatic visible light, and is, for example, a blue LED chip which emits blue light. A plurality of LEDs 212 are, for example, mounted along multiple lines or in a matrix on board 211, and sealed by a sealing member (not illustrated).

The sealing member is made from, for example, a resin material, and is formed so as to collectively seal LEDs 212. For example, the sealing member may be linearly formed so as to form each line of LEDs 212, or may be formed in a round or rectangle shape so as to collectively seal LEDs 212.

The sealing member is mainly made from, for example, a light-transmissive material, and includes a phosphor as a wavelength converting material. For example, the sealing member includes YAG based yellow phosphor particles, and is excited by blue light emitted from LEDs 212 and emits yellow light. Accordingly, the sealing member emits white light as a combined light of the yellow light resulting from excitation and the blue light from LEDs 212.

Light emitting unit 210 is disposed on a predetermined surface. Specifically, as FIG. 18 illustrates, light emitting unit 210 is disposed on and fixed to support base 250. For example, light emitting unit 210 and support base 250 may be fixed by applying adhesive between support base 250 and the back surface of board 211 (the surface opposite to the surface on which LEDs 212 are mounted).

[Reflective Member]

Reflective member 220 is disposed in housing 240, and reflects light emitted from light emitting unit 210. As FIG. 18 illustrates, reflective member 220 includes truncated conical part 221 and circular part 222.

Truncated conical part 221 is a part having an approximately truncated conical shape, and includes entrance opening 223 and exit opening 224. The internal diameter and the external diameter of truncated conical part 221 gradually increase from entrance opening 223 toward exit opening 224.

Entrance opening 223 is an opening where light emitted from light emitting unit 210 enters. Exit opening 224 is an opening where light entered entrance opening 223 exits. An end portion of truncated conical part 221 on entrance opening 223 side is configured so as to surround the light emitting region of light emitting unit 210. In other words, the area of entrance opening 223 is greater than or approximately the same as the light emitting region of light emitting unit 210. The area of exit opening 224 is not particularly limited. For example, the range illuminated by light can be increased by increasing the area of exit opening 224. On the other hand, the range illuminated by light can be decreased by reducing the area of exit opening 224.

Truncated conical part 221 includes reflective surface 225 which reflects light emitted from light emitting unit 210. Specifically, the inner surface of truncated conical part 221 is reflective surface 225.

As FIG. 20 illustrates, truncated conical part 221 includes through-hole 226. Through-hole 226 is a hole for inserting wireless module 270. The shape of through-hole 226, for example, depends on the shape of wireless module 270, and is rectangle.

Circular part 222 is a part having an approximately annular shape, and includes a plurality of recesses 227 on its outer ends. Recesses 227 are engaged with claw parts 232 of light-transmissive member 230. Accordingly, when light-transmissive member 230 is rotated, reflective member 220 also rotates in accordance with the rotation of light-transmissive member 230. In other words, the position of reflective member 220 is changeable in housing 240.

Reflective member 220 is not always required to include circular part 222. In other words, since exit opening 224 is larger when circular part 222 is not included, the range illuminated by light can be increased.

Reflective member 220 is, for example, made from a hard white resin material having electrically insulating properties. In order to improve reflectance, reflective surface 225 may be formed on the internal surface of resin reflective member 220 (truncated conical part 221) by coating a metal deposition film made from a metal material such as silver or aluminum. Alternatively, reflective member 220 may be entirely formed using a metal material such as aluminum.

[Light-Transmissive Member]

Light-transmissive member 230 is made from a light-transmissive material so as to allow light emitted from light emitting unit 210 to be taken out. For example, light-transmissive member 230 is made from a resin material such as acrylic resin (PMMA) or polycarbonate (PC). Light-transmissive member 230 may be transparent having no light diffusion properties (the internal structure is viewable), or may have light diffusion properties. For example, an opalescent light diffusing film can be formed by depositing, on the internal or external surface of light-transmissive member 230, a resin including a light diffusing material such as silica or calcium carbonate, or a white pigment.

As FIG. 20 illustrates, light-transmissive member 230 includes plate part 231 and claw parts 232.

Plate part 231 has an approximately circular shape. As FIG. 18 illustrates, plate part 231 is disposed so as to cover exit opening 224 while being in contact with circular part 222 of reflective member 220. The portion, of plate part 231, which covers exit opening 224 (central portion), for example, has an approximately even thickness, whereas the portion, of plate part 231, which contacts circular part 222 (surrounding portion) has a thickness which decreases toward the peripheral portion.

Claw parts 232 are disposed upright on the peripheral portion of plate part 231. Claw parts 232 are engaged with recesses 227 of reflective member 220. Claw parts 232 may have any shape.

[Housing]

Housing 240 houses light emitting unit 210, and, as FIG. 18 illustrates, includes larger-diameter part 241 and smaller-diameter part 242. Larger-diameter part 241 is a thin part having an approximately circular tube shape, and has inner and external diameters larger than smaller-diameter part 242. Smaller-diameter part 242 is a thin part having an approximately circular tube shape, and has inner and external diameters smaller than larger-diameter part 241. Larger-diameter part 241 and smaller-diameter part 242 are integrally formed.

Housing 240 is made from, for example, a resin material having electrically insulating properties, such as polybutylene terephthalate (PBT). Housing 240 may be made from metal instead of resin.

As FIG. 18 illustrates, light emitting unit 210, reflective member 220, lighting board 260, and wireless module 270 are disposed inside housing 240. Specifically, light emitting unit 210 is disposed in smaller-diameter part 242, and reflective member 220, lighting board 260, and wireless module 270 are disposed in larger-diameter part 241. Moreover, housing 240 includes support base 250 so as to cover the opening on the smaller-diameter part 242 side, and includes light-transmissive member 230 so as to cover the opening on the larger-diameter part 241 side.

[Support Base]

Support base 250 is a support member which supports light emitting unit 210 and housing 240. Support base 250 also functions as a heat sink that dissipates heat generated by light emitting unit 210. As such, support base 250 preferably includes a metal material such as aluminum or a resin material having a high rate of thermal conductivity.

Support base 250 also functions as a predetermined base connected to a lighting fixture (not illustrated) together with housing 240 and power supply terminals 263 of lighting board 260. Lighting apparatus 200 includes a standardized base structure which complies with a socket of the lighting fixture. Examples of such a base structure include, as described above, a GX53 base or a GH76p base.

[Lighting Board]

As FIG. 19 illustrates, lighting board 260 includes lighting circuit board 261 and power supply board 262. For example, lighting board 260 corresponds to controller 22 according to Embodiment 1, and is capable of simultaneously turning on lighting apparatuses.

Lighting circuit board 261 is a printed wiring board on which metal lines are patterned. Lighting circuit board 261 includes a lighting circuit for supplying power to light emitting unit 210. Specifically, metal lines and circuit elements (not illustrated) disposed on lighting circuit board 261 form the lighting circuit.

Examples of the circuit elements include semiconductor elements such as a capacitor such as an electrolytic capacitor or a ceramic capacitor, a resistor, a coil element, a choke coil (choke transformer), a noise filter, a diode, and an integrated circuit element. Many of the circuit elements are mounted on the main surface of lighting circuit board 261 on the light emitting side (that is, on the light-transmissive member 230 side).

As FIG. 19 illustrates, lighting circuit board 261 is a circular board including ring-shaped opening 264, and includes larger-external diameter part 261a and smaller-external diameter part 261b. Larger-external diameter part 261a is larger in external diameter than smaller-external diameter part 261b. Each of larger-external diameter part 261a and smaller-external diameter part 261b has an approximately semicircular shape.

Larger-external diameter part 261a includes connector 265. Connector 265 is a connector for connecting wireless module 270.

Lighting circuit board 261 is held by housing 240 so as to be rotatable about lamp axis J. In other words, lighting circuit board 261 is rotatable in accordance with the rotation of reflective member 220, light-transmissive member 230, and wireless module 270. Specifically, rotation of light-transmissive member 230 allows light-transmissive member 230 and wireless module 270 which is connected to connector 265 to be rotated in accordance with the rotation of light-transmissive member 230.

Lighting circuit board 261 and light emitting unit 210 are connected by, for example, lead not illustrated. Here, since lighting circuit board 261 is rotatable, the lead has a sufficient length to maintain connection even if lighting circuit board 261 is rotated.

Power supply board 262 is a board for externally receiving power, and is a printed wiring board on which metal lines are patterned. Power supply board 262 is connected to power supply terminals 263. Power supply board 262 supplies power supplied from power supply terminals 263, to lighting circuit board 261. For example, power supply board 262 and lighting circuit board 261 are electrically connected by a brush. Power supply board 262 is fixed to housing 240.

Each of power supply terminals 263 is an electrically conductive pin, and has a function to receive power for turning on light emitting unit 210 from outside lighting apparatus 200. In other words, power supply terminals 263 are electrical connecting pins for power supply.

For example, a pair of power supply terminals 263 receives predetermined AC power from lighting fixture. Power supply terminals 263 supplies the received AC power to the lighting circuit via the metal lines and the brush disposed on power supply board 262 and the metal lines disposed on lighting circuit board 261. A pair of power supply terminals 263 may receive two different DC powers instead of AC power.

Power supply terminals 263 also function as an attachment part for attaching lighting apparatus 200 to the lighting fixture. Specifically, lighting apparatus 200 is held by the lighting fixture by power supply terminals 263 being connected to the socket of the lighting fixture.

As FIG. 18 illustrates, power supply terminals 263 are disposed so as to protrude outward from the bottom of housing 240 (specifically, larger-diameter part 241). Specifically, power supply terminals 263 are press-fitted into the through-hole of larger-diameter part 241 of housing 240 and fixed.

[Wireless Module]

Wireless module 270 is a communication unit for performing wireless communication. Wireless module 270 is disposed in housing 240 such that the position of wireless module 270 is changeable. Details of changing the position of wireless module 270 in housing 240 will be described later. Wireless module 270 performs wireless communication using, for example, ZigBee (registered trademark), Bluetooth (registered trademark), or Wi-Fi (registered trademark).

Figure 21A:
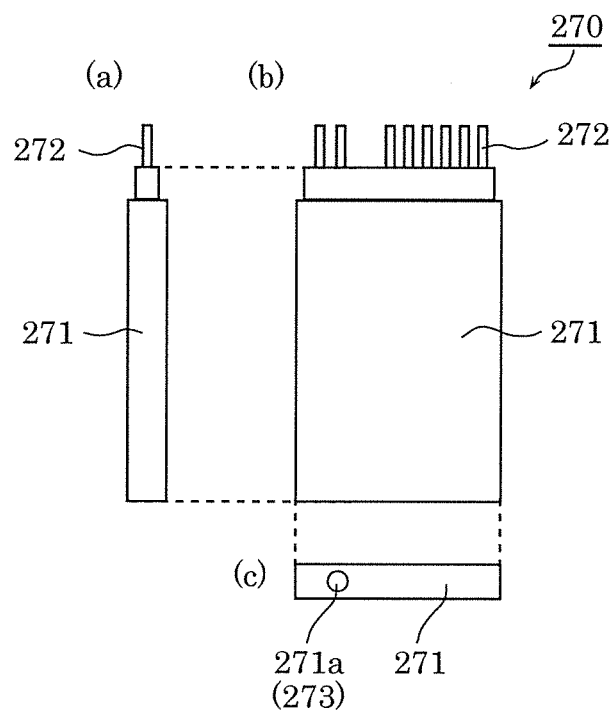
FIG. 21A is a side view, a front view, and a bottom view of a wireless module according to Embodiment 3 of the present disclosure.
Figure 21B:
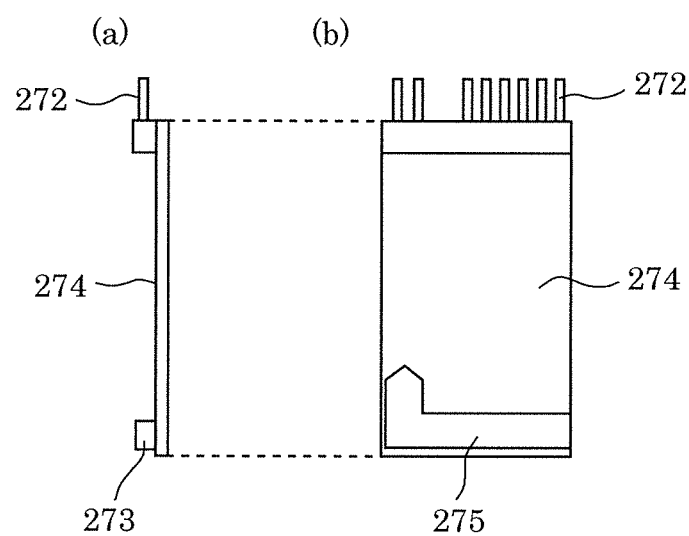
FIG. 21B is a side view and a front view of a communication control board included in the wireless module according to Embodiment 3 of the present disclosure.
Figure 21C:
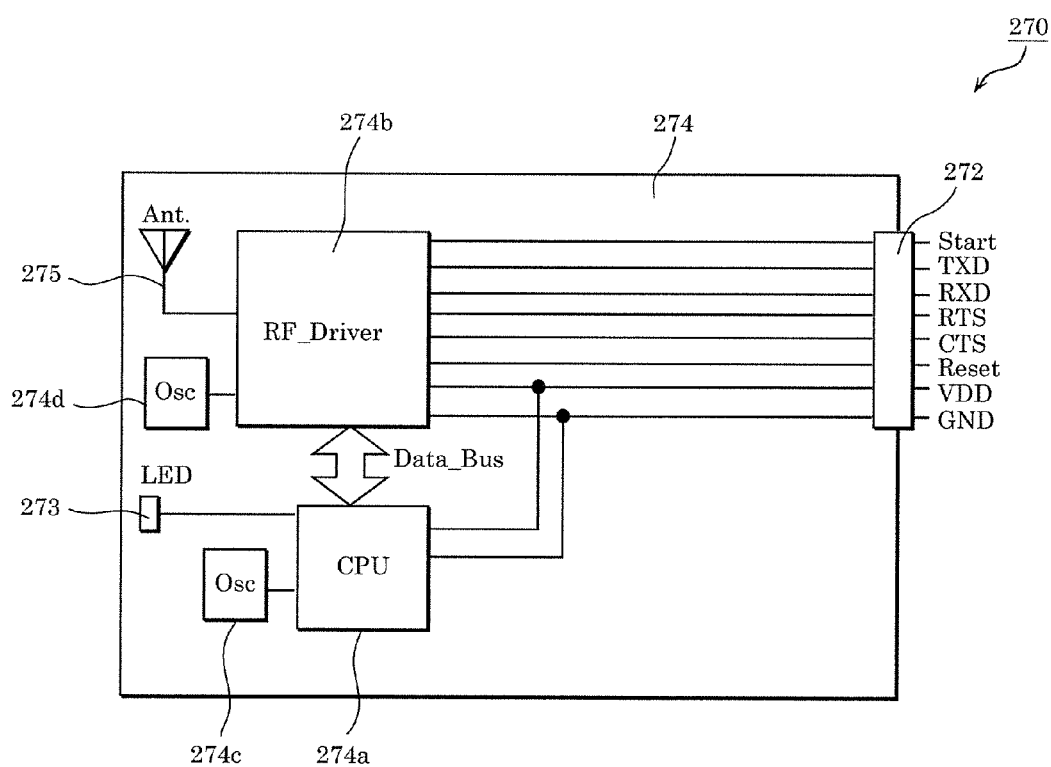
FIG. 21C is a block diagram of a configuration of the wireless module according to Embodiment 3 of the present disclosure.

FIG. 21A illustrates (a) a side view, (b) a front view, and (c) a bottom view of wireless module 270 according to Embodiment 3. FIG. 21B illustrates (a) a side view and (b) a front view of communication control board 274 included in wireless module 270 according to Embodiment 3. FIG. 21C is a block diagram of a configuration of wireless module 270 according to Embodiment 3.

As FIG. 21A and FIG. 21B illustrate, wireless module 270 includes resin case 271, connector 272, point light source 273, communication control board 274, and antenna 275.

Resin case 271 is a case for protecting communication control board 274 and antenna 275. Resin case 271 has, for example, an approximately cuboid shape, and covers communication control board 274 so as to expose connector 272.

Resin case 271 has a bottom surface (surface opposite to the connector 272 side) including through-hole 271a near point light source 273. Light emission of point light source 273 can be checked through through-hole 271a. In the case where resin case 271 has light-transmissive properties, through-hole 271a is not required.

Connector 272 is a connector for connecting to lighting circuit board 261. Specifically, connector 272 is a female connector which is connected to male connector 265 provided in lighting circuit board 261. Connection of connector 272 to connector 265 allows a signal which is based on a wireless signal transmitted or received by antenna 275 to be transmitted to or received from the lighting circuit.

Point light source 273 is a light source having a lighting state which changes according to the strength of the received wireless signal. For example, point light source 273 is an LED. Point light source 273 emits brighter light with an increase in the radio field strength of the wireless signal received by antenna 275. Alternatively, point light source 273 emits light when the radio field strength of the wireless signal received by antenna 275 is greater than or equal to a predetermined threshold, and does not emit light when the strength is less than the threshold. The lighting state is not always required to be brightness, but may be emission color. In other words, the emission color may be changed according to the strength of the received wireless signal.

Accordingly, the communication state of wireless communication can be checked by visually checking the lighting state of point light source 273. For example, when changing the orientation of wireless module 270, point light source 273 emits bright light when wireless module 270 is in the orientation where antenna 275 receives a wires signal accurately.

Communication control board 274 is a printed wiring board including antenna 275. Specifically, communication control board 274 includes a wireless control circuit such as an integrated circuit (IC) mounted thereon. As FIG. 18 illustrates, communication control board 274 is disposed perpendicularly to board 211 of light emitting unit 210. In other words, communication control board 274 is disposed perpendicularly to the surface on which light emitting unit 210 is disposed (the surface of support base 250 on which light emitting unit 210 is disposed). Specifically, communication control board 274 is inserted to through-hole 226 of reflective member 220 so that antenna 275 is exposed to the reflective surface 225 side of reflective member 220.

As FIG. 21C illustrates, communication control board 274 includes, for example, CPU 274a, wireless driving circuit 274b, and oscillators 274c and 274d, as wireless control circuits.

For example, the wireless control circuit generates a control signal for switching between turn-on and turn-off of light emitting unit 210 based on the wireless signal received by antenna 275. The generated control signal is supplied to the lighting circuit of lighting circuit board 261 via connectors 272 and 265, to switch between turn-on and turn-off of light emitting unit 210.

The wireless signal is not limited to a signal for switching between turn-on and turn-off of light emitting unit 210. For example, the wireless signal may be a signal for dimming and adjusting color of light emitted from light emitting unit 210.

Antenna 275 is a pattern antenna for transmitting or receiving a wireless signal. In other words, antenna 275 includes wiring pattern (conductive pattern) disposed on communication control board 274. Disposing antenna 275 on communication control board 274 as a pattern antenna leads to downsizing of antenna 275.

Antenna 275 may be an antenna for at least transmitting or receiving a wireless signal, and is not limited to the pattern antenna. For example, antenna 275 may be a chip antenna.

In Embodiment 3, the frequency band of the wireless signal transmitted or received by antenna 275 is ultra high frequency (UHF) or super high frequency (SHF).

In the case where wireless module 270 is inserted to through-hole 226 of reflective member 220 to be connected to connector 265, antenna 275 is disposed on reflective surface 225 side of reflective member 220. In other words, antenna 275 is exposed to reflective surface 225 side of reflective member 220. Since light-transmissive member 230 is made from a resin material which transmits radio waves, antenna 275 is capable of transmitting or receiving the wireless signal even if reflective member 220 and housing 240 are made from metal materials which block radio waves.

[Change in Position of Wireless Module]

Wireless module 270 according to Embodiment 3 is disposed such that the position of wireless module 270 is changeable. In other words, the positions of communication control board 274 and antenna 275 are changeable. Specifically, the positions of communication control board 274 and antenna 275 are changeable in accordance with the change in position of reflective member 220 and lighting board 260.

As described above, wireless module 270 is inserted to through-hole 226 of reflective member 220 to be connected to connector 265 of lighting board 260. In this state, reflective member 220 and lighting board 260 are capable of rotating about lamp axis J serving as a rotary axis. Here, wireless module 270 is rotated in accordance with the rotation of reflective member 220 and lighting board 260.

Accordingly, for example, as the white arrows in FIG. 17 illustrate, rotation of reflective member 220 allows the position (including the orientation) of wireless module 270 to be changed in housing 240. Accordingly, wireless module 270 can be disposed at a position with higher received signal strength, leading to increased communication quality of wireless communication.

Here, the position of wireless module 270 can be continuously changed by rotating reflective member 220. Accordingly, for example, in comparison to the case where wireless module 270 can only be disposed at certain positions as in Variation of Embodiment 3 to be described later, antenna 275 can be disposed at a position with higher received signal strength.

[Conclusion]

As described above, lighting apparatus 200 according to Embodiment 3 further includes housing 240 which houses light emitting unit 210. Wireless module 270 includes antenna 275 for transmitting or receiving a wireless signal, and communication control board 274 including antenna 275. The position of communication control board 274 is changeable in housing 240.

With this, the position of communication control board 274 including antenna 275 is changeable in housing 240. Accordingly, communication control board 274 can be disposed at a position which allows antenna 275 to have a higher received signal strength. Hence, communication quality of wireless communication can be increased. Since communication errors and the like in wireless communication can be reduced, for example, lighting apparatuses 200 can be simultaneously turned on.

Moreover, for example, lighting apparatus 200 further includes reflective member 220 disposed in housing 240 and including reflective surface 225 which reflects light emitted from light emitting unit 210. Antenna 275 is disposed on reflective surface 225 side of reflective member 220.

With this, since antenna 275 is exposed to reflective surface 225 side of reflective member 220, antenna 275 is capable of transmitting or receiving a wireless signal even if reflective member 220 and housing 240 are made from metal materials which block radio waves.

Moreover, for example, reflective member 220 includes through-hole 226 into which communication control board 274 is insertable. Communication control board 274 is inserted to through-hole 226 so that antenna 275 is exposed to reflective surface 225 side.

With this, since antenna 275 is exposed to reflective surface 225 side of reflective member 220, antenna 275 is capable of transmitting or receiving a wireless signal even if reflective member 220 and housing 240 are made from metal materials which block radio waves.

Moreover, for example, the position of reflective member 220 is changeable in housing 240. The position of antenna 275 is changeable in accordance with the change in position of reflective member 220.

This allows, for example, the position of antenna 275 to be changed while fixing communication control board 274 including antenna 275 to reflective member 220.

Moreover, for example, light emitting unit 210 is disposed on a predetermined surface, and communication control board 274 is disposed perpendicularly to the predetermined surface.

With this, antenna 275 is exposed from reflective member 220 such as a metal reflective plate or metallic plating, and thus, communication quality of wireless communication can be increased in comparison to the structure where an antenna is housed in housing 240.

Moreover, for example, communication control board 274 is a printed wiring board, and antenna 275 includes a wiring pattern disposed on communication control board 274.

Accordingly, antenna 275 and communication control board 274 can be downsized.

Moreover, for example, wireless module 270 further includes point light source 273 having a lighting state which changes according to the strength of a received wireless signal.

With this, the lighting state of point light source 273 is changed according to the strength of the received wireless signal, and thus, communication state of wireless communication can be checked by visually checking the lighting state of point light source 273. For example, when changing the orientation of wireless module 270, point light source 273 emits bright light when wireless module 270 is in the orientation where antenna 275 receives a wires signal accurately.

Embodiment 3 has described the example where reflective member 220 includes one through-hole 226, but the present disclosure is not limited to the example. Reflective member 220 may include a plurality of through-holes 226. Here, lighting board 260 may include a plurality of connectors 265 positioned corresponding to the positions of through-holes 226. With this, for example, wireless module 270 can be selectively inserted to one of through-holes 226, allowing selective connection to a corresponding one of connectors 265. In other words, the position of wireless module 270 is changeable.

In such a case, too, since wireless module 270 can be disposed at a position which allows antenna 275 to have a higher received signal strength, the communication quality of wireless communication can be increased.

(Variation of Embodiment 3)

Figure 22A:
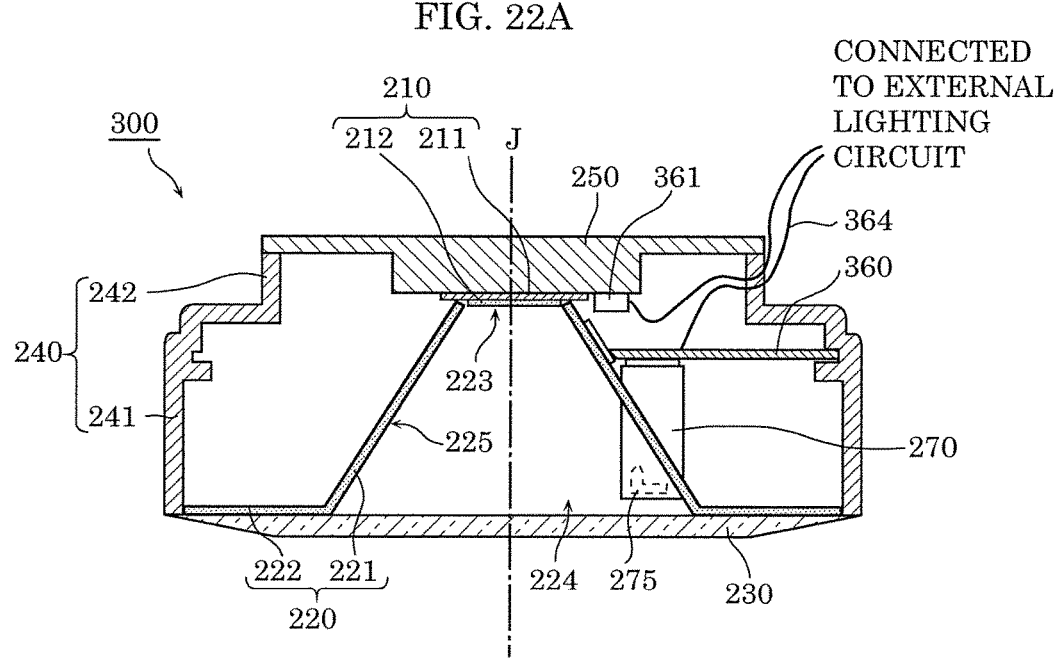
FIG. 22A is a cross-sectional view of a lighting apparatus according to Variation of Embodiment 3 of the present disclosure.
Figure 22B:
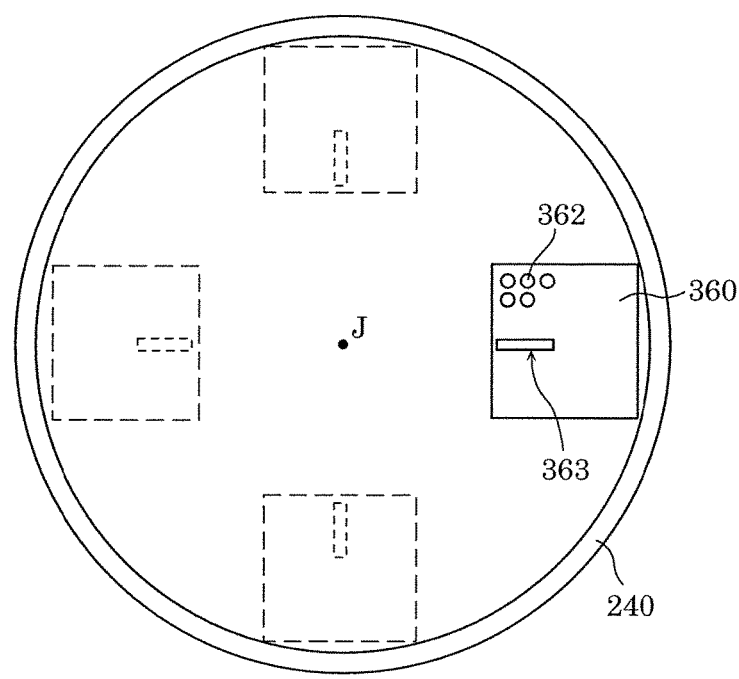
FIG. 22B is a plan view of a layout of a relay board according to Variation of Embodiment 3 of the present disclosure.

Next, Variation of Embodiment 3 will be described with reference to FIG. 22A and FIG. 22B. FIG. 22A is a cross-sectional view of lighting apparatus 300 according to Variation of Embodiment 3. FIG. 22B is a plan view of a layout of relay boards 360 included in lighting apparatus 300 according to Variation of Embodiment 3.

Embodiment 3 has described the example where the position of antenna 275 can be changed to an optimal position by rotating lighting board 260. In Variation of Embodiment 3, the position of antenna 275 is changed by changing the position of lighting board 260.

As FIG. 22A illustrates, lighting apparatus 300 according to Variation of Embodiment 3 is different from lighting apparatus 200 illustrated in FIG. 18 in that relay board 360 and connector 361 are included instead of lighting board 260.

Relay board 360 is a board which relays a signal between wireless module 270 and an external lighting circuit. Relay board 360 is, for example, a printed wiring board on which metal lines are patterned. As FIG. 22B illustrates, relay board 360 includes terminal group 362 and connector 363.

Terminal group 362 includes a power supply terminal and a signal terminal. Terminal group 362 is a terminal for connecting to an external lighting circuit, and is connected to lead 364 as FIG. 22A illustrates. With this, terminal group 362 supplies power supplied from the external lighting circuit, to wireless module 270. Terminal group 362 allows transmission and reception of a predetermined signal such as a turn-on instruction between wireless module 270 and the external lighting circuit.

Connector 363 is a connector for connecting wireless module 270. Connector 363 is, for example, the same as connector 272, and is a female connector. For example, the turn-on instruction received by wireless module 270 is output to light emitting unit 210 via relay board 360, lead 364, and connector 361.

In Variation of Embodiment 3, as FIG. 22B illustrates, relay board 360 can be disposed at one of four positions. Specifically, housing 240 has four positions at which relay board 360 can be disposed. For example, relay board 360 is disposed by fitting into a recess or the like provided in housing 240.

The change in position of relay board 360 also changes the position of wireless module 270. In other words, when the position of relay board 360 is changed, the position of antenna 275 is also changed accordingly.

As described above, since the position of wireless module 270 is changeable in housing 240 in Variation of Embodiment 3 as well, wireless module 270 can be disposed at a position which allows antenna 275 to have a higher received signal strength. Hence, the communication quality of wireless communication can be increased. Since communication errors and the like in wireless communication can be reduced, for example, lighting apparatuses 300 can be simultaneously turned on.

Embodiment 4

Next, a lighting apparatus according to Embodiment 4 will be described.

[Lighting Apparatus]

Figure 23A:
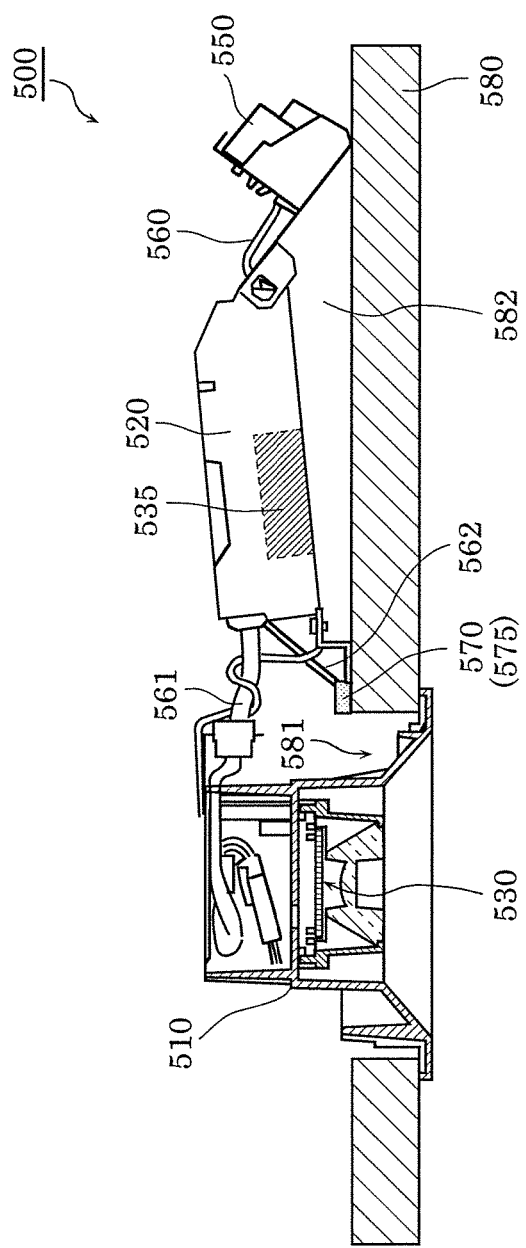
FIG. 23A is a cross-sectional view of a lighting apparatus according to Embodiment 4 of the present disclosure.
Figure 23B:
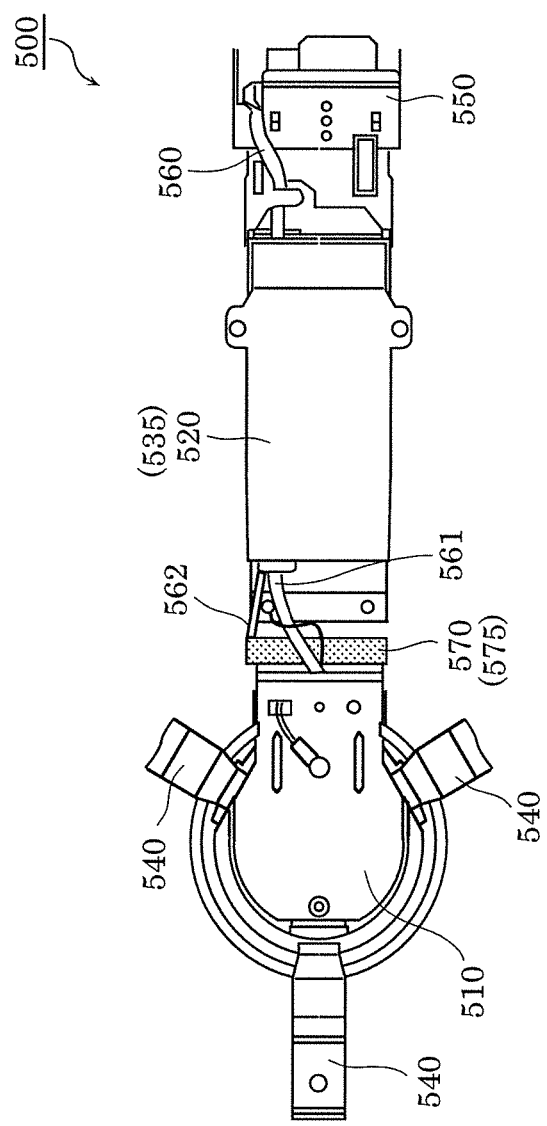
FIG. 23B is a top view of a lighting apparatus according to Embodiment 4 of the present disclosure.

FIG. 23A is a cross-sectional view of lighting apparatus 500 according to Embodiment 4, and FIG. 23B is a top view of lighting apparatus 500.

As FIG. 23A and FIG. 23B illustrate, lighting apparatus 500 according to Embodiment 4 is a sunken lighting apparatus, such as a recessed light, which emits light downward (toward the floor or a wall) by being installed, for example, in ceiling 580 of a house. Lighting apparatus 500 includes wireless communication function.

As FIG. 23A and FIG. 23B illustrate, lighting apparatus 500 includes fixture body 510, first housing 520 and second housing 570. Fixture body 510 houses light emitting unit 530. First housing 520 houses lighting circuit 535. Second housing 570 houses communication unit 575. Lighting apparatus 500 further includes attachment springs 540 and attachment part 550.

The following provides detailed descriptions of each structural member included in lighting apparatus 500.

Light emitting unit 530 is a light emitting module which includes a light emitting element, and emits light of a predetermined color. In Embodiment 4, light emitting unit 530 is a COB light-emitting module or a light emitting module including a surface mount device (SMD) element.

Fixture body 510 is a housing which houses light emitting unit 530, and has, for example, an approximately truncated conical shape. Fixture body 510 has an outer surface to which attachment springs 540 are attached. A plurality of heat dissipating fins which project outward may be disposed on the outer surface of fixture body 510.

First housing 520 is a metal housing which houses lighting circuit 535. First housing 520 is formed by, for example, bending a metal plate member such as aluminum. First housing 520 has an approximately cuboid shape.

First housing 520 is disposed above a predetermined surface so as to form space 582 between first housing 520 and the predetermined surface. The predetermined surface is the top side of ceiling 580, that is, the back surface of ceiling 580.

Lighting circuit 535 supplies power which is for turning on light emitting unit 530. Lighting circuit 535 is an example of a controller which controls turn-on and turn-off of light emitting unit 530. For example, lighting circuit 535 executes the same functions as those executed by controller 22 according to Embodiment 1. Lighting circuit 535 is connected to communication unit 575 in second housing 570 via cable 562.

Attachment springs 540 are fixed to the outer surface of fixture body 510 so as to be biased outward. Attachment springs 540 are used for attaching lighting apparatus 500 (fixture body 510) to embedded hole 581.

Attachment part 550 is connected to a cable (not illustrated) connected to a grid power (commercial power) which is a supplier of AC power. Attachment part 550 supplies AC power obtained via the cable to lighting circuit 535 in first housing 520 via cable 560. Attachment part 550 is disposed on one lengthwise end of first housing 520.

Cable 560 is a cable for supplying the AC power received by attachment part 550, to lighting circuit 535 in first housing 520. Cable 561 is a cable for lighting circuit 535 in first housing 520 to supply power to light emitting unit 530 in fixture body 510. Cable 562 is a cable for outputting, to lighting circuit 535 in first housing 520, a command such as a turn-on instruction received by communication unit 575 in second housing 570.

Second housing 570 houses communication unit 575. Second housing 570 is made from, for example, an electrically insulating resin material. Second housing 570 has, for example, an approximately cuboid shape.

As FIG. 23A and FIG. 23B illustrate, second housing 570 is disposed outside fixture body 510 and first housing 520. Specifically, second housing 570 is disposed between fixture body 510 and first housing 520.

Communication unit 575 is, for example, wireless module 270 according to Embodiment 3. In other words, communication unit 575 includes an antenna to perform wireless communication. Specifically, communication unit 575 executes the same functions as those executed by communication unit 23 according to Embodiment 1. For example, communication unit 575 receives a turn-on instruction by performing wireless communication with the control device and the like. The received turn-on instruction is output to lighting circuit 535 via cable 562.

[Return Loss of Antenna]

As described above, lighting apparatus 500 according to Embodiment 4 is attached to embedded hole 581 disposed in ceiling 580. Above the ceiling, heat insulators, pipes and the like made from various materials may exist. In particular, in the case where the insulators, the pipes and the like are made from metal, the electric waves emitted from communication unit 575 are absorbed by the metal, which may result in degraded communication quality.

The following describes various assumptions of environment above the ceiling and measurement of return loss of communication unit 575 of lighting apparatus 500 under the assumed conditions.

FIG. 24 illustrates possible cases assumed in installation of lighting apparatus 500 according to Embodiment 4. Here, six cases (a) to (f) are assumed.

(a) indicates a case where no heat insulator is disposed above the ceiling. In other words, (a) indicates a case where only lighting apparatus 500 (or lighting apparatus 500 and non-metal members) are disposed above the ceiling.

(b) to (d) indicate cases where heat insulators are disposed above the ceiling. In (b), glass fiber is used as a heat insulator. In (c), glass fiber with aluminum foil is used as a heat insulator. (d) assumes a case where glass fiber with aluminum foil is used as a heat insulator having a thickness reduced due to aged degradation. Specifically, the reduction of thickness of the glass fiber with aluminum foil due to aged degradation was achieved by compressing the glass fiber using a futon compressing apparatus.

(e) assumes a case where a deck plate is present above the ceiling. (f) assumes a case where metal building materials such as pipes, wiring, ducts are present.

Figure 25:
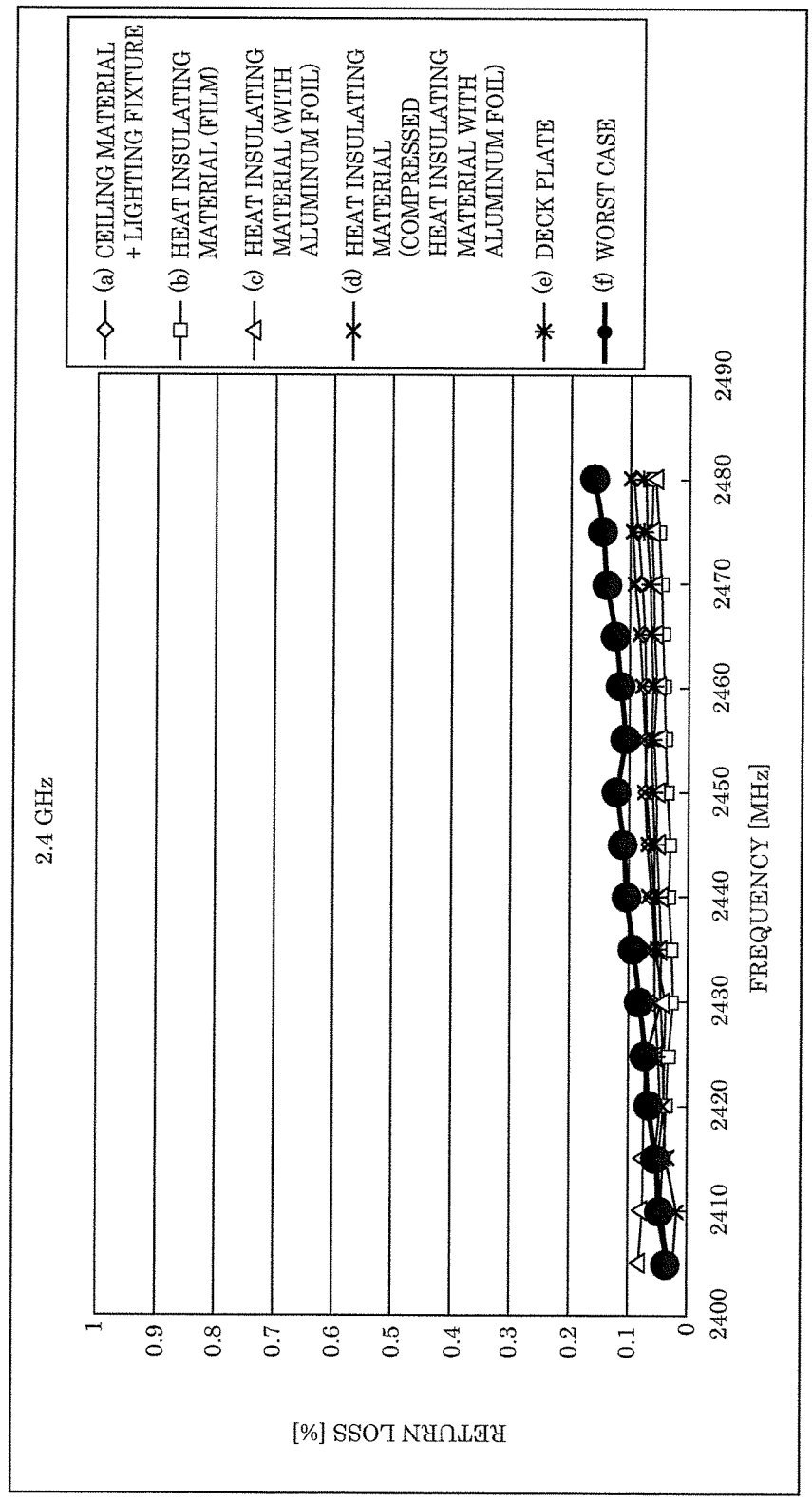
FIG. 25 illustrates return loss of an antenna included in the lighting apparatus according to Embodiment 4 of the present disclosure in the use of a wireless signal of 2.4 GHz band.

FIG. 25 illustrates results of measurement of return loss of lighting apparatus 500 according to Embodiment 4 based on the above six cases. FIG. 25 illustrates return loss of the antenna included in lighting apparatus 500 according to Embodiment 4 in the use of a wireless signal of 2.4 GHz band.

As FIG. 25 illustrates, in the use of a frequency of 2.4 GHz band, return loss is 0.1% or less except the case of (f) where metal building materials are present. In the case of (f), too, return loss is 0.2% or less. This means that sufficiently high-quality wireless communication can be performed.

Figure 26:
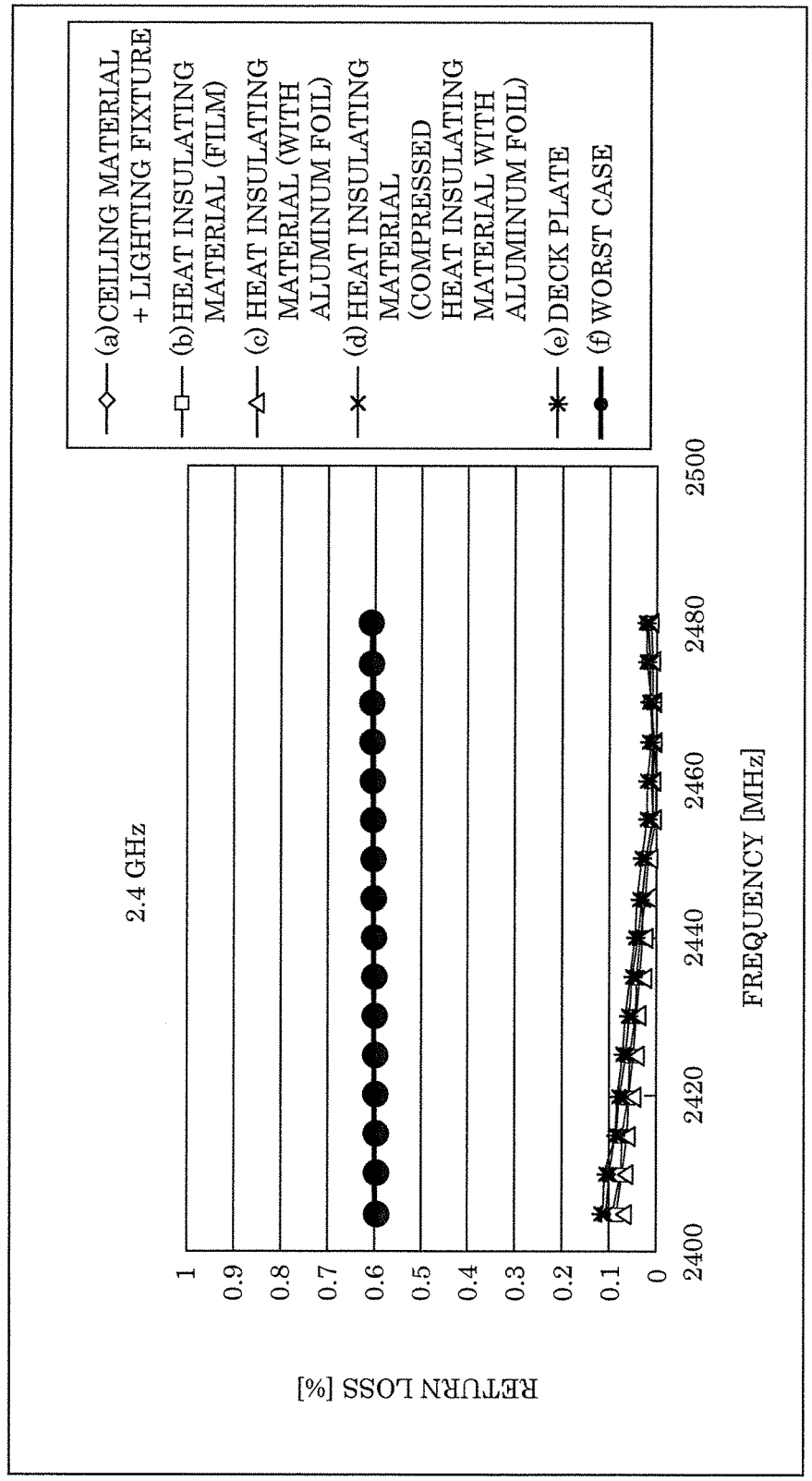
FIG. 26 illustrates return loss of an antenna included in a lighting apparatus according to a comparative example of Embodiment 4 of the present disclosure in the use of a wireless signal of 2.4 GHz band.

Now, a lighting apparatus according to a comparative example of Embodiment 4 will be described with reference to FIG. 26. FIG. 26 illustrates return loss of an antenna included in the lighting apparatus according to the comparative example of Embodiment 4 in the use of a wireless signal of 2.4 GHz band.

In the lighting apparatus according to the comparative example, the antenna is attached to first hosing 520 without being covered. In other words, the lighting apparatus according to the comparative example does not include second housing 570.

As FIG. 26 illustrates, in the use of a frequency of 2.4 GHz band, return loss in the case of (f) is 0.6% approximately. Accordingly, as can be understood from the comparison between FIG. 25 and FIG. 26, the suppression effect of return loss according to Embodiment 4 is noticeable particularly in the case of (f).

Figure 27:
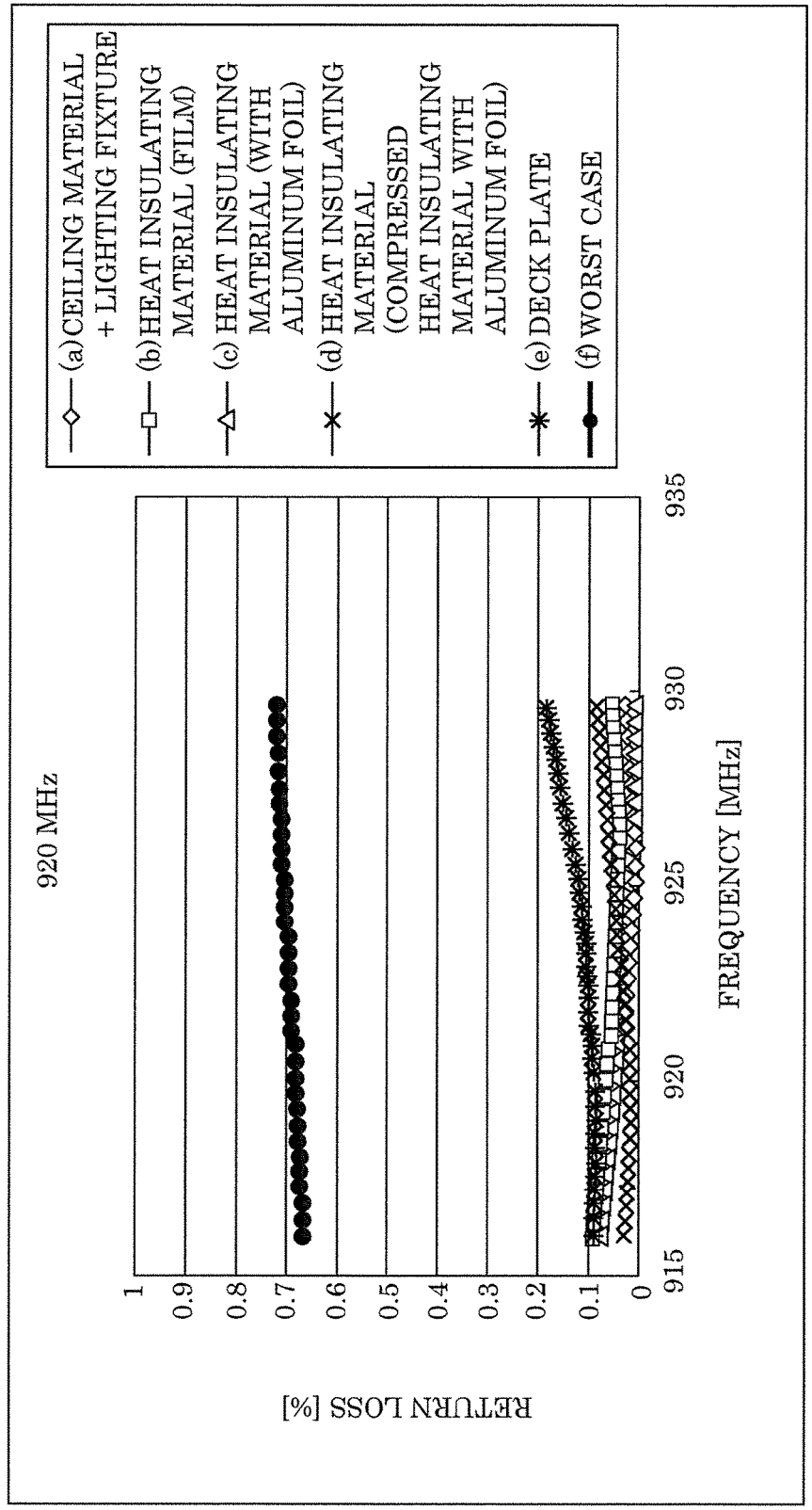
FIG. 27 illustrates return loss of the antenna included in the lighting apparatus according to Embodiment 4 of the present disclosure in the use of a wireless signal of 920 MHz band.

FIG. 27 illustrates return loss of the antenna included in lighting apparatus 500 according to Embodiment 4 in the use of a wireless signal of 920 MHz band. As FIG. 27 illustrates, in the use of a frequency of 920 MHz band, return loss in the case of (f) is 0.7% approximately. This shows that it is preferable in Embodiment 4 that communication unit 575 uses a frequency of 2.4 GHz band.

[Conclusion]

As described above, lighting apparatus 500 according to Embodiment 4 further includes: fixture body 510 which houses light emitting unit 530, lighting circuit 535 which supplies power for turning on light emitting unit 530, first housing 520 which houses lighting circuit 535, and second housing 570 which houses communication unit 575. Second housing 570 is disposed outside fixture body 510 and first housing 520.

Accordingly, disposing second housing 570 which houses communication unit 575 outside first housing 520 which houses lighting circuit 535 reduces return loss of the antenna, leading to increased communication quality of wireless communication. Accordingly, since communication errors and the like in wireless communication can be reduced, for example, lighting apparatuses 500 can be simultaneously turned on.

Moreover, for example, second housing 570 is disposed between fixture body 510 and first housing 520.

Accordingly, disposing second housing 570 which houses communication unit 575 between fixture body 510 which houses light emitting unit 530 and first housing 520 which houses lighting circuit 535 reduces return loss of the antenna, leading to increased communication quality of wireless communication.

Moreover, for example, communication unit 575 performs wireless communication using a frequency greater than or equal to 2.4 GHz.

Use of the frequency greater than or equal to 2.4 GHz increases communication quality of wireless communication.

(Variation of Embodiment 4)

Embodiment 4 has described the example where second housing 570 which houses communication unit 575 is disposed between fixture body 510 and first housing 520, but the present disclosure is not limited to the example. The following describes Variations of Embodiment 4.

[Variation 1]

Figure 28A:
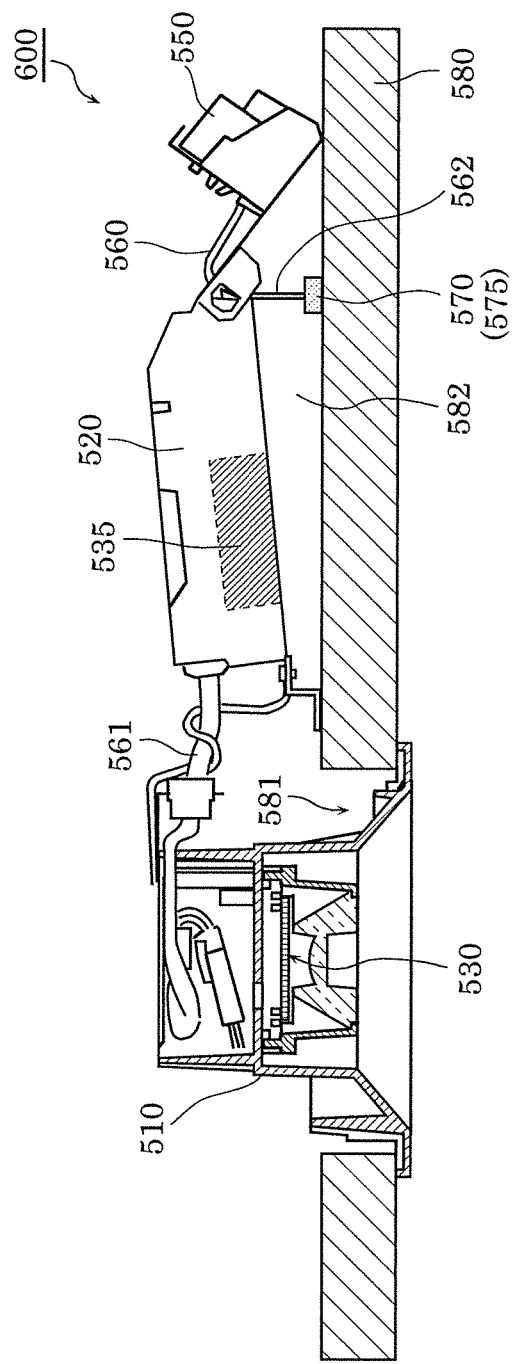
FIG. 28A is a cross-sectional view of a lighting apparatus according to Variation 1 of Embodiment 4 of the present disclosure.
Figure 28B:
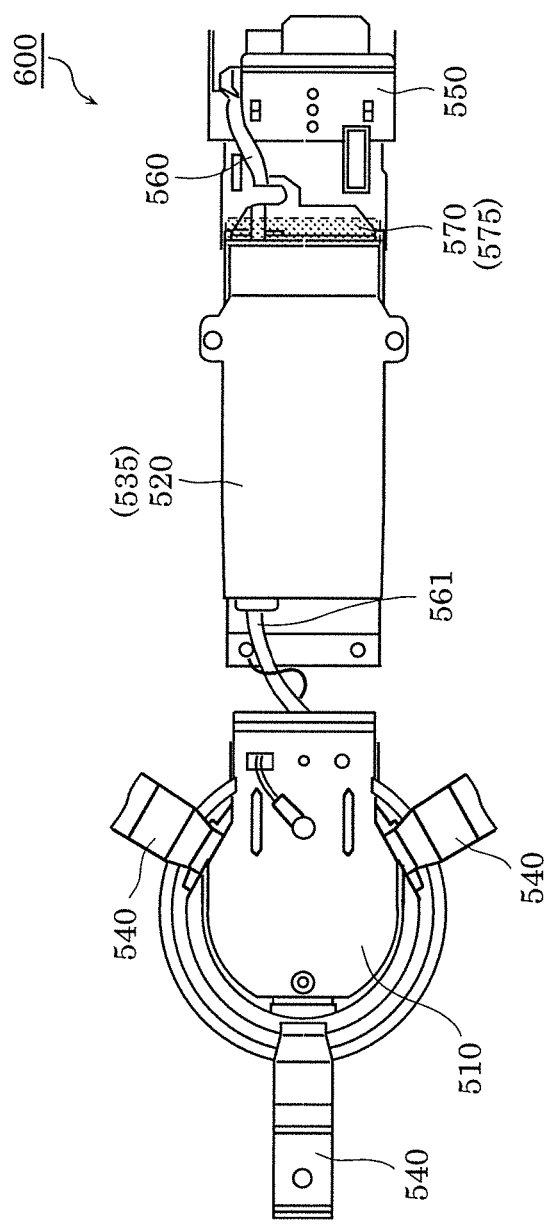
FIG. 28B is a top view of the lighting apparatus according to Variation 1 of Embodiment 4 of the present disclosure.

FIG. 28A is a cross-sectional view of lighting apparatus 600 according to Variation 1 of Embodiment 4, and FIG. 28B is a top view of lighting apparatus 600.

In Variation 1 of Embodiment 4, as FIG. 28A and FIG. 28B illustrate, second housing 570 is disposed in space 582 between first housing 520 and ceiling 580. Communication unit 575 is connected to lighting circuit 535 in first housing 520 via cable 562.

Figure 29:
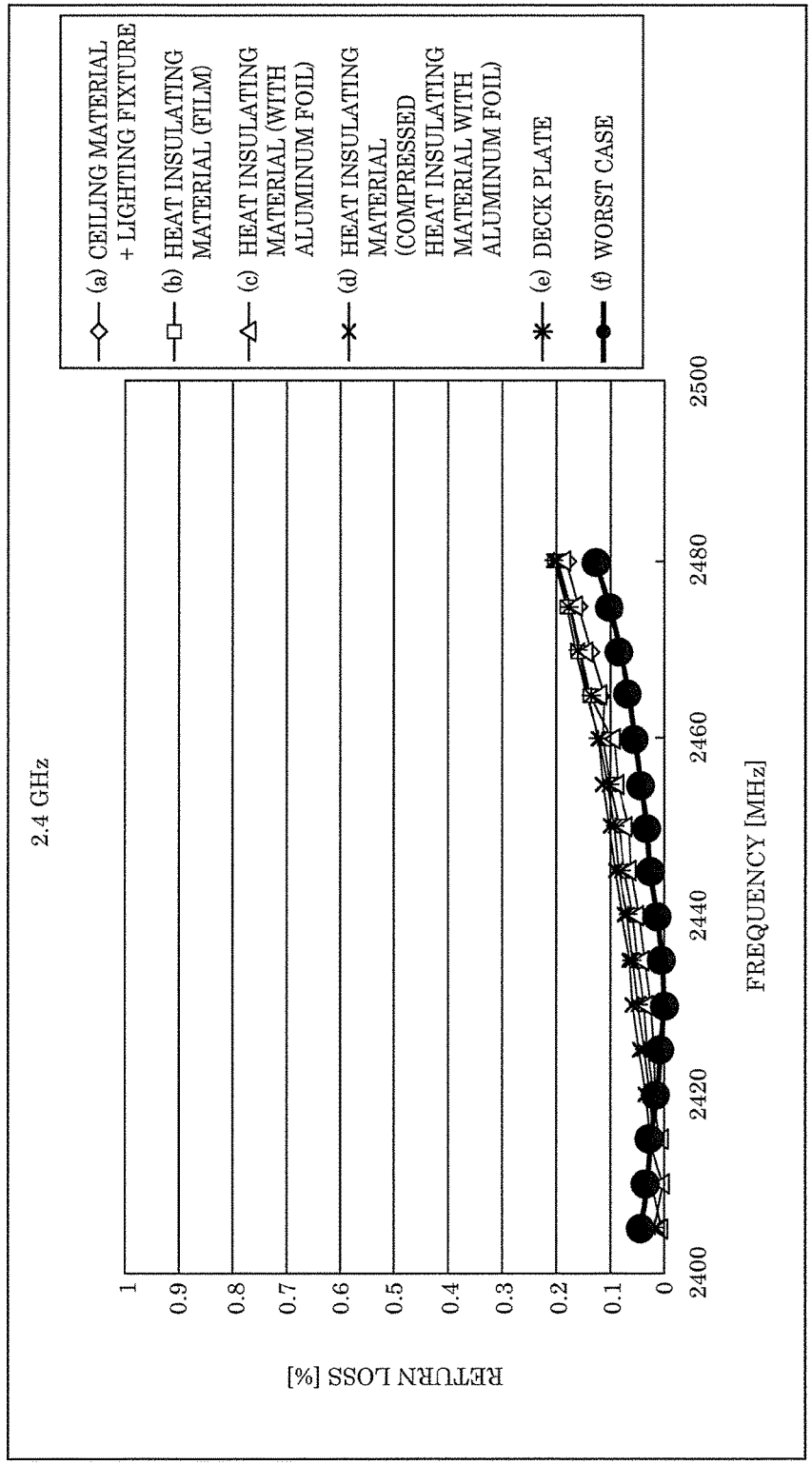
FIG. 29 illustrates return loss of an antenna included in the lighting apparatus according to Variation 1 of Embodiment 4 of the present disclosure in the use of a wireless signal of 2.4 GHz band.
Figure 30:
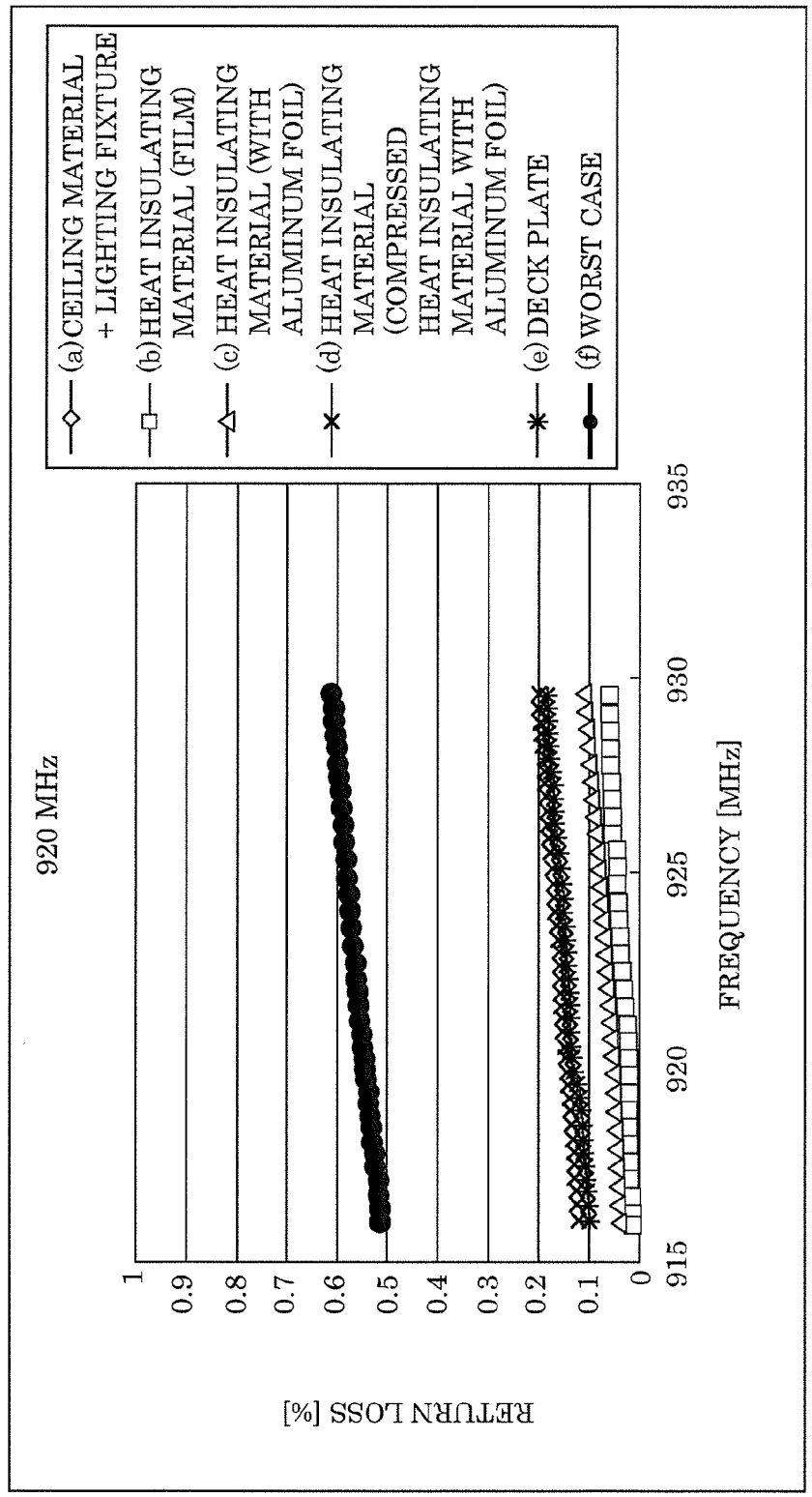
FIG. 30 illustrates return loss of the antenna included in the lighting apparatus according to Variation 1 of Embodiment 4 of the present disclosure in the use of a wireless signal of 920 MHz band.

FIG. 29 and FIG. 30 each illustrate return loss of an antenna included in lighting apparatus 600 according to Variation 1 of Embodiment 4 in the use of a frequency of 2.4 GHz band and 920 MHz band.

As FIG. 29 illustrates, return loss in the use of a frequency of 2.4 GHz band is 0.2% or less in all cases of (a) to (f). Accordingly, lighting apparatus 600 according to Variation 1 of Embodiment 4 is capable of performing sufficiently high-quality wireless communication.

Moreover, as understood from the comparison with lighting apparatus 500 illustrated in FIG. 25, lighting apparatus 600 according to Variation 1 of Embodiment 4 has a lower return loss in the case of (f) where metal building materials are present. With this, wireless communication with higher quality can be performed by changing the position of second housing which houses communication unit 575 according to the environment above the ceiling where the lighting apparatus is disposed.

On the other hand, as FIG. 30 illustrates, in the use of a frequency of 920 MHz band, return loss in the case of (f) is high similarly to Embodiment 4. However, the return loss is 0.7% approximately in Embodiment 4, whereas the return loss in Variation 1 of Embodiment 4 is 0.6% or less, which shows improvement in communication quality. Accordingly, in the case of (f), for example, communication quality of wireless communication can be increased by disposing second housing 570 in space 582 between first housing 520 and ceiling 580.

As described, in lighting apparatus 600 according to Variation 1 of Embodiment 4, for example, first housing 520 is disposed above a predetermined surface so as to form space 582 between first housing 520 and the predetermined surface, and second housing 570 is disposed in space 582.

This increases communication quality of wireless communication.

[Variation 2]

Figure 31:
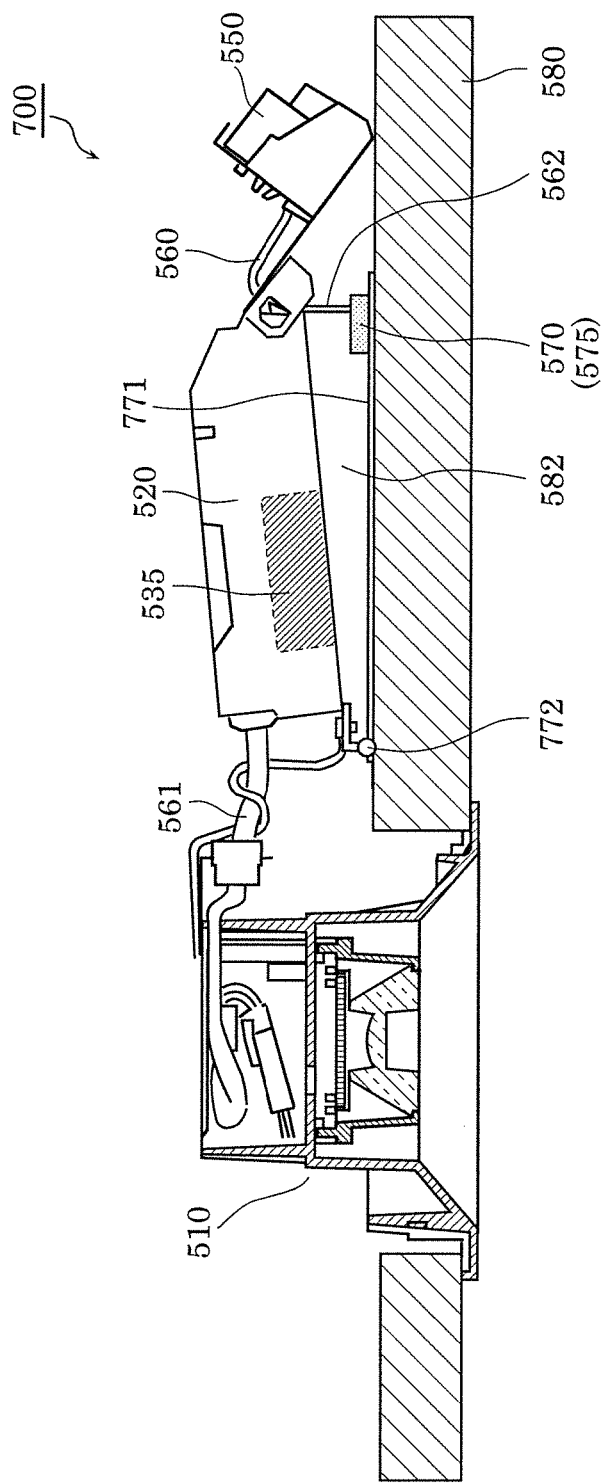
FIG. 31 is a cross-sectional view of a lighting apparatus according to Variation 2 of Embodiment 4 of the present disclosure.

FIG. 31 is a cross-sectional view of lighting apparatus 700 according to Variation 2 of Embodiment 4.

In Variation 2 of Embodiment 4, as FIG. 31 illustrates, lighting apparatus 700 includes plate 771 made from an electrically insulating material, and movable part 772 which movably connects plate 771 to a portion of first housing 520.

Plate 771 is connected to the bottom side of first housing 520 via movable part 772. When first housing 520 is disposed above the predetermined surface, plate 771 is fixed to the predetermined surface. Furthermore, second housing 570 which houses communication unit 575 is attached to plate 771.

In Variation 2 of Embodiment 4, plate 771 is pivotally connected to an end portion of the bottom of first housing 520 about movable part 772. For example, the crosswise direction of the bottom of first housing 520 (specifically, the direction orthogonal to the drawing sheet of FIG. 31) is the axial direction of the pivot. Plate 771 is pivotable such that plate 771 departs from the bottom of first housing 520. Accordingly, by causing plate 771 to pivot according to the size of space 582 between first housing 520 and ceiling 580, plate 771 can be brought into contact with the predetermined surface of ceiling 580.

As described above, lighting apparatus 700 according to Variation 2 of Embodiment 4 further includes, for example, plate 771 made from an electrically insulating material, and movable part 772 movably connecting plate 771 to a portion of first housing 520. Plate 771 is fixed to the predetermined surface when first housing 520 is disposed above the predetermined surface, and second housing 570 is attached to plate 771.

Accordingly, the positional relationship between first housing 520 and second housing 570 can be easily changed by moving plate 771. This facilitates installation of lighting apparatus 700.

Variation 2 of Embodiment 4 has described the example where plate 771 is rotatable about the crosswise direction of the bottom surface of first housing 520. Plate 771 may be rotatable about the direction perpendicular to the bottom surface of first housing 520 (or thickness direction of ceiling 580). This facilitates installation t of lighting apparatus 700.

[Variation 3]

Figure 32:
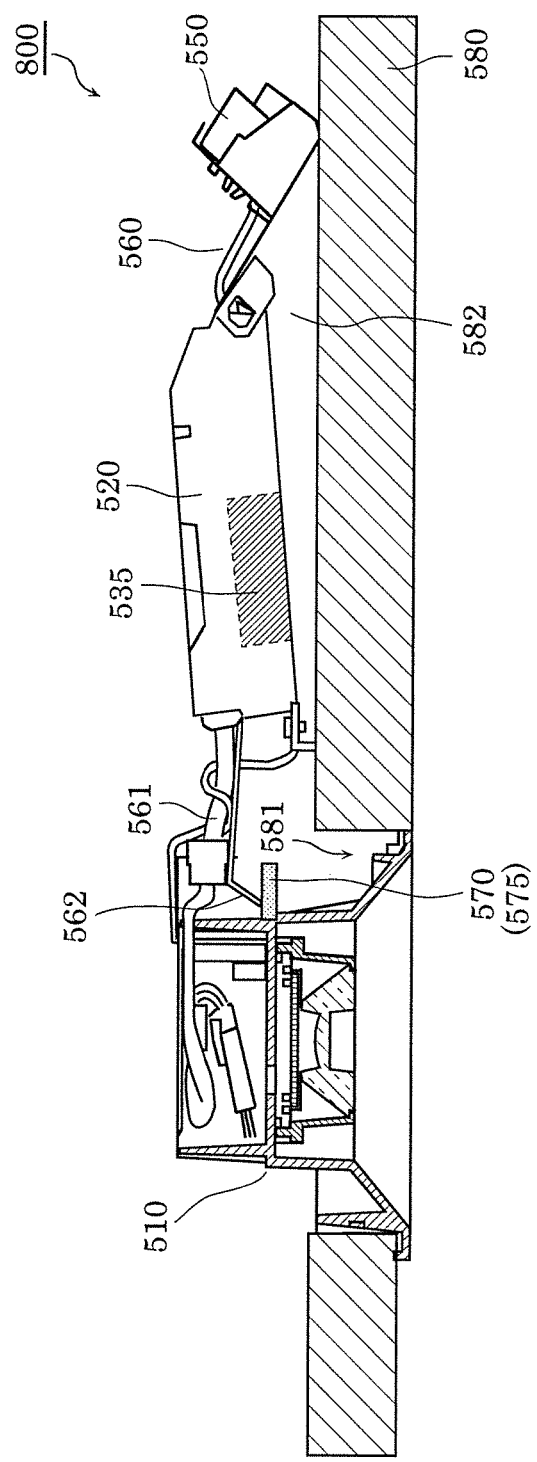
FIG. 32 is a cross-sectional view of a lighting apparatus according to Variation 2 of Embodiment 4 of the present disclosure.

FIG. 32 is a cross-sectional view of lighting apparatus 800 according to Variation 3 of Embodiment 4.

In Variation 3, second housing 570 which houses communication unit 575 is disposed in contact with a side surface of fixture body 510.

For example, second housing 570 is bonded to a side surface of fixture body 510 by an adhesive or the like. Alternatively, second housing 570 may be disposed on a predetermined surface of fixture body 510, or may be inserted to a recess disposed on a side surface of fixture body 510. Second housing 570 may be attached to fixture body 510 in any methods.

Accordingly, even when, for example, ceiling 580 includes metal building materials, communication unit 575 is capable of performing wireless communication using embedded hole 581 of ceiling 580. Here, since second housing 570 is disposed in contact with a side surface of fixture body 510, second housing 570 is disposed approximately immediately above embedded hole 581. Hence, communication quality of wireless communication can be increased.

(Others)

Although the lighting apparatus and the lighting system according to the present disclosure have been described based on the embodiments and their variations, the present disclosure is not limited to these embodiments and variations.

For example, the above embodiments have described the examples where the antenna is mounted on a printed wiring board, but the antenna according to the present disclosure is not limited to the examples. The antenna may be a dipole antenna.

Embodiments 2 to 4 and their variations may be implemented independently of Embodiment 1. In other words, Embodiments 2 to 4 and their variations may be implemented as a structure not including the structural elements recited in independent claims which indicate the broadest concepts of the present disclosure. For example, wireless module 270 according to Embodiment 3 may simply perform control of turn-on and turn-off of light emitting unit 210, and is not required to perform control for simultaneous turn-on according to Embodiment 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus which is one of a plurality of lighting apparatuses each capable of performing wireless communication with a device, the lighting apparatus comprising:

a light emitting unit;
a controller which controls turn-on of the light emitting unit; and
a communication unit configured to perform wireless communication with the device to obtain a correction time from the device, the correction time being based on communication delay between the device and each of the plurality of lighting apparatuses,
wherein the communication unit is further configured to obtain a turn-on instruction for turning on the light emitting unit from the device, and to transmit a response to the turn-on instruction to the device by performing carrier sense, upon obtainment of the turn-on instruction,
the controller calculates a standby time by subtracting a communication latency from the correction time, after the response is transmitted to the device, the communication latency being a period taken from when the turn-on instruction is obtained to when the carrier sense is successfully performed and the response is transmitted to the device, and
the controller turns on the light emitting unit after passage of the standby time from when the response is transmitted to the device.

2. The lighting apparatus according to claim 1, wherein the device and the plurality of lighting apparatuses are connected in a star topology, and
the device transmits the turn-on instruction to the plurality of lighting apparatuses using multicast.

3. The lighting apparatus according to claim 1, wherein the communication unit is capable of performing wireless communication with another one of the plurality of lighting apparatuses.

4. The lighting apparatus according to claim 1, wherein the plurality of lighting apparatuses are located within a 30 m radius from the device.

5. The lighting apparatus according to claim 1, wherein the correction time is calculated based on a communication time between the device and a lighting apparatus requiring a longest communication time among the plurality of lighting apparatuses.

6. The lighting apparatus according to claim 1, wherein the communication unit is configured to perform the wireless communication using only a predetermined frequency.

7. The lighting apparatus according to claim 1, wherein the communication unit is configured to perform the wireless communication using a frequency ranging from 421 MHz to 2483.5 MHz, inclusive.

8. The lighting apparatus according to claim 1, further comprising
a housing which houses the light emitting unit,
wherein the communication unit includes:
an antenna for either one of transmitting and receiving a wireless signal; and
a communication control board including the antenna, and
a position of the communication control board is changeable in the housing.

9. The lighting apparatus according to claim 8, further comprising
a reflective member disposed in the housing and having a reflective surface which reflects light emitted from the light emitting unit,
wherein the antenna is disposed on a reflective surface side of the reflective member.

10. The lighting apparatus according to claim 9,
wherein the reflective member includes one or more through-holes through which the communication control board is insertable, and
the communication control board is inserted into one of the one or more through-holes so as to expose the antenna on the reflective surface side.

11. The lighting apparatus according to claim 10,
wherein a position of the reflective member is changeable in the housing, and
a position of the antenna is changeable in accordance with a change in position of the reflective member.

12. The lighting apparatus according to claim 8,
wherein the light emitting unit is disposed on a predetermined surface, and
the communication control board is disposed perpendicularly to the predetermined surface.

13. The lighting apparatus according to claim 8,
wherein the communication control board is a printed wiring board, and
the antenna includes a wiring pattern disposed on the communication control board.

14. The lighting apparatus according to claim 8,
wherein the communication unit further includes a light source having a lighting state which changes according to a strength of the wireless signal received.

15. The lighting apparatus according to claim 1, further comprising
a fixture body which houses the light emitting unit;
a lighting circuit which supplies electric power for turning on the light emitting unit;
a first housing which houses the lighting circuit; and
a second housing which houses the communication unit,
wherein the second housing is disposed outside the fixture body and the first housing.

16. The lighting apparatus according to claim 15,
wherein the first housing is disposed above a predetermined surface so as to form a space between the first housing and the predetermined surface, and
the second housing is disposed in the space.

17. The lighting apparatus according to claim 16, further comprising:
a plate comprising an electrically insulating material; and
a movable part which movably connects the plate to a portion of the first housing,
wherein the plate is fixed to the predetermined surface when the first housing is disposed above the predetermined surface, and
the second housing is attached to the plate.

18. The lighting apparatus according to claim 15,
wherein the second housing is disposed between the fixture body and the first housing.

19. The lighting apparatus according to claim 18,
wherein the second housing is disposed in contact with a side surface of the fixture body.

20. The lighting apparatus according to claim 15,
wherein the communication unit is configured to perform the wireless communication using a frequency greater than or equal to 2.4 GHz.

21. A lighting system comprising:
a device; and
a plurality of lighting apparatuses each capable of performing wireless communication with the device, wherein the device includes:
a correction time calculator which calculates a correction time which is based on communication delay between the device and each of the plurality of lighting apparatuses; and
a first communication unit configured to perform wireless communication with the plurality of lighting apparatuses to transmit, to the plurality of lighting apparatuses, the correction time and a turn-on instruction for turning on the plurality of lighting apparatuses,
each of the plurality of lighting apparatuses includes:
a light emitting unit;
a controller which controls turn-on of the light emitting unit; and
a second communication unit configured to obtain the correction time and the turn-on instruction from the device, and to transmit a response to the turn-on instruction to the device by performing carrier sense, upon obtainment of the turn-on instruction,
the controller calculates a standby time by subtracting a communication latency from the correction time, after the response is transmitted to the device, the communication latency being a period taken from when the turn-on instruction is obtained to when the carrier sense is successfully performed and the response is transmitted to the device, and
the controller turns on the light emitting unit after passage of the standby time from when the response is transmitted to the device.

* * * * *